United States Patent
Blevins et al.

(10) Patent No.: US 8,571,696 B2
(45) Date of Patent: Oct. 29, 2013

(54) METHODS AND APPARATUS TO PREDICT PROCESS QUALITY IN A PROCESS CONTROL SYSTEM

(75) Inventors: Terrence Lynn Blevins, Round Rock, TX (US); Wilhelm K. Wojsznis, Austin, TX (US); Mark Nixon, Round Rock, TX (US); Paul Richard Muston, Narborough (GB); Christopher Worek, Austin, TX (US); Randolf Reiss, Dripping Springs, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 871 days.

(21) Appl. No.: 12/538,995

(22) Filed: Aug. 11, 2009

(65) Prior Publication Data

US 2010/0318934 A1 Dec. 16, 2010

Related U.S. Application Data

(60) Provisional application No. 61/185,859, filed on Jun. 10, 2009.

(51) Int. Cl.
*G06F 19/00* (2011.01)
*G06F 17/18* (2006.01)
*G06F 11/30* (2006.01)
*G06F 7/60* (2006.01)
*G05B 13/02* (2006.01)
*G01N 31/00* (2006.01)

(52) U.S. Cl.
USPC .......... 700/108; 700/29; 700/37; 700/44; 700/110; 702/81; 702/84; 702/179; 702/183; 702/185; 703/2

(58) Field of Classification Search
CPC ............. G05B 17/02; G05B 23/0243
USPC ........ 700/29, 37, 44, 45, 108, 109, 110, 121; 702/81, 84, 179, 183, 185; 703/2; 705/9

See application file for complete search history.

(56) References Cited

U.S. PATENT DOCUMENTS

| | | | |
|---|---|---|---|
| 5,121,467 | A | 6/1992 | Skeirik |
| 5,442,562 | A | 8/1995 | Hopkins et al. |

(Continued)

FOREIGN PATENT DOCUMENTS

| | | |
|---|---|---|
| EP | 2161636 | 3/2010 |
| JP | 2006252465 | 9/2006 |

(Continued)

OTHER PUBLICATIONS

Kosanovich et al., Improved Process Understanding Using Multiway Principal Component Analysis, Ind. Eng. Chem. Res. 1996, 35, 138-146.*

(Continued)

*Primary Examiner* — Kavita Padmanabhan
*Assistant Examiner* — Darrin Dunn
(74) *Attorney, Agent, or Firm* — Hanley, Flight & Zimmerman, LLC

(57) ABSTRACT

Example methods and apparatus to predict process quality in a process control system are disclosed. A disclosed example method includes receiving process control information relating to a process at a first time including a first value associated with a first measured variable and a second value associated with a second measured variable, determining if a variation based on the received process control information associated with the process exceeds a threshold, if the variation exceeds the threshold, calculating a first contribution value based on a contribution of the first measured variable to the variation and a second contribution value based on a contribution of the second measured variable to the variation, determining at least one corrective action based on the first contribution value, the second contribution value, the first value, or the second value, and calculating a predicted process quality based on the at least one corrective action at a time after the first time.

30 Claims, 23 Drawing Sheets

(56) References Cited

U.S. PATENT DOCUMENTS

| | | | |
|---|---|---|---|
| 5,761,093 A * | 6/1998 | Urbish et al. | 700/107 |
| 5,859,885 A | 1/1999 | Rusnica et al. | |
| 6,577,323 B1 | 6/2003 | Jamieson et al. | |
| 6,587,108 B1 | 7/2003 | Guerlain et al. | |
| 6,704,012 B1 | 3/2004 | Lefave | |
| 6,816,747 B2 * | 11/2004 | Mammoser et al. | 700/109 |
| 6,901,560 B1 | 5/2005 | Guerlain et al. | |
| 6,952,808 B1 | 10/2005 | Jamieson et al. | |
| 7,000,193 B1 | 2/2006 | Impink, Jr. et al. | |
| 7,031,880 B1 | 4/2006 | Seem et al. | |
| 7,177,780 B2 * | 2/2007 | Hillam et al. | 702/156 |
| 7,181,355 B2 * | 2/2007 | Kondo et al. | 702/84 |
| 7,212,208 B2 | 5/2007 | Khozai | |
| 7,292,245 B2 | 11/2007 | Goggin | |
| 7,734,451 B2 * | 6/2010 | MacArthur et al. | 703/2 |
| 7,917,330 B2 * | 3/2011 | Susumago | 702/179 |
| 8,013,864 B2 * | 9/2011 | Foslien | 345/589 |
| 8,014,880 B2 * | 9/2011 | Samardzija et al. | 700/17 |
| 2002/0072882 A1 * | 6/2002 | Kruger et al. | 703/2 |
| 2002/0177909 A1 * | 11/2002 | Fu et al. | 700/28 |
| 2003/0045962 A1 | 3/2003 | Eryurek et al. | |
| 2003/0158680 A1 * | 8/2003 | Hupkes et al. | 702/85 |
| 2005/0159835 A1 | 7/2005 | Yamada et al. | |
| 2006/0020423 A1 * | 1/2006 | Sharpe, Jr. | 702/183 |
| 2006/0047454 A1 * | 3/2006 | Tamaki et al. | 702/84 |
| 2006/0184264 A1 * | 8/2006 | Willis et al. | 700/108 |
| 2006/0200358 A1 | 9/2006 | Ohnemus et al. | |
| 2006/0282186 A1 * | 12/2006 | Hansen et al. | 700/97 |
| 2007/0005266 A1 | 1/2007 | Blevins et al. | |
| 2007/0088528 A1 * | 4/2007 | Miller | 702/185 |
| 2007/0168154 A1 * | 7/2007 | Ericson | 702/179 |
| 2007/0260350 A1 * | 11/2007 | Zagrebnov | 700/121 |
| 2008/0082308 A1 * | 4/2008 | Kant et al. | 703/12 |
| 2008/0091390 A1 * | 4/2008 | Samardzija et al. | 703/2 |
| 2008/0102147 A1 * | 5/2008 | Shioiri et al. | 425/148 |
| 2008/0125898 A1 * | 5/2008 | Harvey et al. | 700/110 |
| 2008/0294382 A1 * | 11/2008 | Lim et al. | 702/185 |
| 2008/0306621 A1 * | 12/2008 | Choi et al. | 700/110 |
| 2009/0149981 A1 * | 6/2009 | Evans et al. | 700/110 |
| 2010/0036529 A1 * | 2/2010 | Landells et al. | 700/270 |

FOREIGN PATENT DOCUMENTS

| | | |
|---|---|---|
| JP | 2009070227 | 4/2009 |
| WO | 2006018741 | 2/2006 |
| WO | 2008106071 A1 | 9/2008 |

OTHER PUBLICATIONS

Kosanovich et al., Process Data Analysis Using Multivariate Statistical Methods, IEEE, 1991.*

Intellectual Property Office, Examination Report, issued for Great Britain Patent Application Serial No. 1008889.6, on Dec. 1, 2011, 1 page.

"Combined Search and Examination Report under Sections 17 and 18(3)," issued by the Intellectual Property Office of Great Britain in connection with British Application No. BG1008889.6, on Sep. 23, 2010, 7 pages.

Nomikos et al., "Multivariate SPC Charts for Monitoring Batch Processes," Technometrics, vol. 37, No. 1, The American Statistical Association and the American Society for Quality Control, Feb. 1995, (19 Pages).

J. Joe Qin, "Statistical process monitoring: basics and beyond," Journal of Chemometrics 2003; 17: 480-502, Published online in Wiley InterScience (www.interscience.wiley.com). (23 Pages).

Ralston et al., "Graphical enhancement to support PCA-bsed process monitoring and fault diagnosis," ISA Transaction 43 (2004) 639-653, The Instrumentation, Systems, and Automation Society, May 2004, (15 Pages).

Nomikos et al., "Multi-way partial least squares in monitoring batch processes," Chemometroics and Intelligent Laboratory Systems 30(1995) 97-108, May 1995, (12 Pages).

Lee et al., "Enhanced process monitoring of fed-batch penicillin cultivation using time-varying and multivariate statistical analysis," Journal of Biotechnology 110 (2004) 119-136, Jan. 2004, (18 Pages).

Intellectual Property Office of Great Britain, Search Report under Section 17 issued in connection with Application No. GB1219049.2, Feb. 19, 2013, 2 pages.

* cited by examiner

ON-LINE BATCH ANALYTICS

PROCESS AREA 1

| BATCH ID | STAGE | STATE | PREDICTION | FAULT |
|---|---|---|---|---|
| 12369<br>12368<br>12367<br>12366<br>12365<br>12364<br>12363<br>12362<br>12361<br>12360<br>12359 | PROCESS | RUN | 0.23 | ☆ TRUE — 604 |

PROCESS AREA 2

| BATCH ID | STAGE | STATE | PREDICTION | FAULT |
|---|---|---|---|---|

FIG. 6

METHODS AND APPARATUS TO PREDICT PROCESS QUALITY IN A PROCESS CONTROL SYSTEM

RELATED APPLICATION

This application claims the benefit of U.S. Provisional Application No. 61/185,859, filed Jun. 10, 2009, the entirety of which is incorporated by reference.

FIELD OF THE DISCLOSURE

The present disclosure relates generally to process control systems and, more particularly, to methods and apparatus to predict process quality in a process control system.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies using the field devices via the buses and/or other communication links.

Process information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations (e.g., workstations). Typically, these application stations are implemented using a personal computer, laptop, or the like that is communicatively coupled to the controllers, operator workstations, and other systems within the process control system via a local area network (LAN). Each application station may include a graphical user interface that displays the process control information including values of process variables, values of quality parameters associated with the process, process fault detection information, and/or process status information.

Typically, displaying process information in the graphical user interface is limited to the display of a value of each process variable associated with the process. Additionally, some process control systems may characterize relationships between some process variables to determine quality metrics associated with the process. However, in cases where a resultant product of the process does not conform to predefined quality control metrics, the process and/or process variables may only be analyzed after the completion of a batch, a process, and/or an assembly of the resulting product. As a result of viewing the process and/or quality variables upon the completion of a process and/or batch, improvements may be implemented to improve the manufacturing and/or the processing of subsequent products. However, these improvements may not remediate the current out-of-spec completed products.

SUMMARY

Example methods and apparatus to predict process quality in a process control system are described. In one example, a method includes receiving process control information relating to a process at a first time including a first value associated with a first measured variable and a second value associated with a second measured variable. The example method further includes determining if a variation based on the received process control information associated with the process exceeds a threshold and if the variation exceeds the threshold, calculating a first contribution value based on a contribution of the first measured variable to the variation and a second contribution value based on a contribution of the second measured variable to the variation. The example method also includes determining at least one corrective action based on the first contribution value, the second contribution value, the first value, or the second value and calculating a predicted process quality based on the at least one corrective action at a time after the first time.

An example apparatus includes a batch data receiver a batch data receiver to receive process control information relating to a process at a first time including a first value associated with a first measured variable and a second value associated with a second measured variable. The example apparatus further includes a processor to determine if a variation based on the received process control information associated with the process exceeds a threshold, if the variation exceeds the threshold, calculate a first contribution value based on a contribution of the first measured variable to the variation and a second contribution value based on a contribution of the second measured variable to the variation, determine at least one corrective action based on the first contribution value, the second contribution value, the first value, or the second value, and calculate a predicted process quality based on the at least one corrective action at a time after the first time.

BRIEF DESCRIPTION OF THE DRAWINGS

FIG. 6 shows a user interface displaying an example process overview chart of the example process control system of FIG. 1.

DETAILED DESCRIPTION

Figure 1:
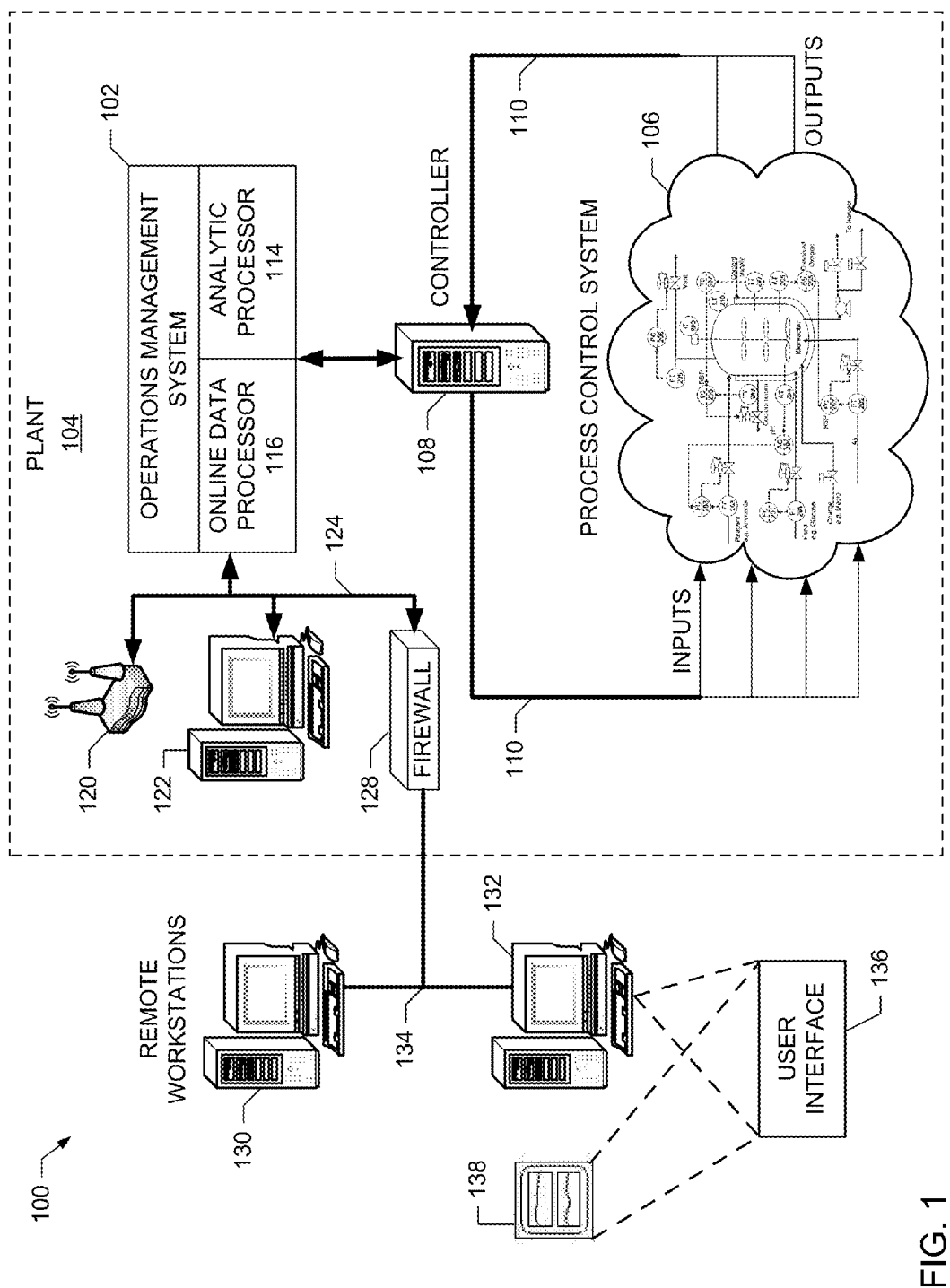
FIG. 1 is a block diagram illustrating an example process control system including an example operations management system.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

Currently, process control systems provide analytic and/or statistical analysis of process control information. However, these systems implement offline tools to determine the cause and potential corrective actions of process control faults that may affect the quality of resulting products. These offline tools may include process studies, lab studies, business studies, troubleshooting, process improvement analysis, and/or six-sigma analysis. While these tools may correct the process for subsequent products, the tools cannot remediate and/or correct process quality as the fault occurs. Thus, these offline tools are reactive to process control conditions and may result in the production of products with quality issues until the process can be corrected.

The example methods and apparatus described herein may be used within a process control system to provide in-process fault detection, analysis, and/or correction information enabling an operator to correct a process fault while the process occurs or is on-going. In other words, process corrections can be implemented in response to predicted faults, at the time a fault occurs or substantially immediately after a fault occurs. The example methods and apparatus described herein may be used to predict and/or correct process faults to improve process quality of a batch and/or continuous process.

Additionally or alternatively, the example methods and apparatus may be used to correct product quality by predicting product quality and correcting corresponding process faults and/or by correcting detected process faults.

An example operations management system (OMS) described herein manages the analysis, organization, and display of process control information generated by the process control system. The example OMS provides process control information to workstations with authority to access the information. A process control system may include any type of batch processing system, continuous processing system, automation system, and/or manufacturing system.

The process control information is generated by field devices within the process control system and may be configured for, for example, process environment measurements (e.g., temperature, concentration, or pressure sensing), field device measurements (e.g., pump speed, valve position, or line speed), process status measurements, and/or process throughput measurements. The process control information may be received by a controller as output variable data (e.g., values associated with variables originating from the field devices). The controller may then forward such variable data to the OMS for analytical and statistical processing based on process models.

The example OMS described herein utilizes descriptive modeling, predictive modeling, and/or optimization to generate feedback regarding the status and/or quality of the process control system. Additionally, the OMS predicts, detects, identifies, and/or diagnoses process operation faults and predicts the impact of any faults on quality variables associated with a quality of a resultant product. A fault may include a process quality fault that is a multivariate and/or statistical combination of outputs from one or more field devices that exceeds a threshold. Additionally, a fault may include outputs from one or more field devices exceeding respective thresholds. Furthermore, the example OMS manages access and control to the process control data via a graphical user interface. This user interface may be used to alert a process control operator to the occurrence of any process control faults. Additionally, the user interface may guide the operator through an analysis process to determine a source of the process fault and to predict an impact of a corrective action to the process fault on the quality of the resultant product(s). The user interface may be accessed by any process control operators with access to the information including process operators who may access the user interface from a remote location via the Internet. The OMS may provide a process control operator process information as the process is occurring, thereby enabling the operator to make adjustments to the process to correct for any faults. By correcting for faults during the process, the operator may maintain a quality of the resulting product and subsequent products.

The example OMS may display the detection, analysis, corrective action, and quality prediction information within one or more charts and/or graphs (e.g., graphics) within the graphical user interface. For example, a process overview chart may display the status of one or more processes being monitored. From this overview chart, an operator may select a process variation graph showing any explained (e.g., modeled) and/or unexplained (e.g., un-modeled) variations within the process. The operator may select a point during the process variation graph that shows contributions of unexplained and explained variations for each process and/or quality variable associated with the overall process variation. The example OMS may determine contribution relationships between process and/or quality variables based on modeling and/or analyzing the process control system.

Within the contribution chart, an operator may identify one or more variables that are contributing to the process fault. Furthermore, the operator may select one or more variables to display a variable trend graph showing values associated with each variable during the process in relation to past averages and/or standard deviations of the variable during previous processes. The operator may then access a process quality prediction graph to determine if the fault will significantly affect the resulting quality of a product resulting from the process. If the quality has not been significantly affected, the operator may use the variable trend information to make appropriate adjustments to the process to correct for any faults.

In an alternative implementation, an operator may display a microchart showing types of faults associated with each of the process and/or quality variables. Additionally, this microchart may include spark lines displaying summary information of past values of each process and/or quality variable during the process. Furthermore, the microchart may include a timeline that displays previous and/or current faults and/or deviations. The operator may scroll to a time on the timeline to display variable contributions, the values of the process and/or quality variables at that selected time. Additionally, the microchart may show predicted calculated and/or overall quality variables for a selected time. The operator may select any one of the variables to view a variable trend graph for that variable or, alternatively, may access a process quality prediction graph. Thus, by providing multivariable analysis data and/or predictive data within easily readable and linked charts and/or graphs (e.g., graphics), the example methods and apparatus described herein enable process control operators to relatively quickly address process control faults before they affect the quality of a resulting product.

While the example methods and apparatus described herein refer to example microcharts, spark lines, combination graphs, overview charts, process variation graphs, process quality prediction graphs, and/or variable trend graphs, the microcharts, spark lines, combination graphs, overview charts, process variation graphs, process quality prediction graphs, and/or variable trend graphs may be graphically implemented in any manner that substantially shows the same type of process control information and/or relationships between process control information. Additionally, while the example OMS generates the example microcharts, spark lines, combination graphs, overview charts, process variation graphs, process quality prediction graphs, and/or variable trend graphs, any other process control controller, server, workstation, and/or component may generate the microcharts, spark lines, combination graphs, overview charts, process variation graphs, process quality prediction graphs, and/or variable trend graphs.

FIG. 1 is a block diagram illustrating an example process control environment 100 including an example operations management system (OMS) 102. In other examples, the OMS 102 may be known as a Process Monitoring and Quality Prediction System (PMS). The example OMS 102 is located within a plant 104 that includes a process control system 106. The example plant 104 may include any type of manufacturing facility, process facility, automation facility, and/or any other type of process control structure or system. In some examples, the plant 104 may include multiple facilities located at different locations. Additionally, although the example plant 104 shows the process control system 106, the plant 104 may include additional process control systems.

The example process control system 106 is communicatively coupled to a controller 108 via a data bus 110. The process control system 106 may include any number of field devices (e.g., input and/or output devices). The field devices may include any type of process control component that is capable of receiving inputs, generating outputs, and/or controlling a process. For example, the field devices may include input devices such as, for example, valves, pumps, fans, heaters, coolers, and/or mixers to control a process. Additionally, the field devices may include output devices such as, for example, thermometers, pressure gauges, concentration gauges, fluid level meters, flow meters, and/or vapor sensors to measure portions of a process. The input devices may receive instructions from the controller 108 to execute a specified command and cause a change to the process. Furthermore, the output devices measure process data, environmental data, and/or input device data and transmit the measured data to the controller 108 as process control information. This process control information may include the values of variables (e.g., measured process variables and/or measured quality variables) corresponding to a measured output from each field device.

In the illustrated example of FIG. 1, the example controller 108 may communicate with the field devices within the process control system 106 via the data bus 110. This data bus 110 may be coupled to intermediate communication components within the process control system 106. These communication components may include field junction boxes to communicatively couple field devices in a command area to the data bus 110. Additionally, the communication components may include marshalling cabinets to organize the communication paths to the field devices and/or field junction boxes. Furthermore, the communication components may include I/O cards to receive data from the field devices and convert the data into a communication medium capable of being received by the example controller 108. Additionally, these I/O cards may convert data from the controller 108 into a data format capable of being processed by the corresponding field devices. In one example, the data bus 110 may be implemented using the Fieldbus protocol or other types of wired and/or wireless communication protocols (e.g., Profibus protocol, HART protocol, etc.).

The example controller 108 of FIG. 1 manages one or more control routines to manage the field devices within the process control system 106. The control routines may include process monitoring applications, alarm management applications, process trending and/or history applications, batch processing and/or campaign management applications, statistical applications, streaming video applications, advanced control applications, etc. Furthermore, the controller 108 forwards process control information to the example OMS 102. The control routines may ensure that the process control system 106 produces specified quantities of a desired product within a certain quality threshold. For example, the process control system 106 may be configured as a batch system that produces a product at a conclusion of a batch. In other examples, the process control system 106 may include a continuous process manufacturing system that constantly produces products.

The process control information from the controller 108 may include values corresponding to measured process and/or quality variables that originate in the field devices within the process control system 106. In other examples, the OMS 102 may parse values within the process control information into the corresponding variables. The measured process variables may be associated with process control information originating from field devices that measure portions of the process and/or characteristics of the field devices. The measured quality variables may be associated with process control information related to measuring characteristics of the process that are associated with at least a portion of a completed product.

For example, the process control system 106 may include a chemical reaction in a tank that produces a concentration of a chemical in a fluid. In this example, the concentration of the chemical in the fluid may be a quality variable. A temperature of the fluid and a rate of fluid flow into the tank may be process variables. The example OMS 102, via process control modeling and/or monitoring, may determine that the concentration of the fluid in the tank is based on the temperature of the fluid in the tank and the fluid flow rate into the tank. Thus, not only is the concentration a quality variable, but the fluid flow rate and the fluid temperature contribute to or affect the quality of the concentration. In other words, the measured process variables contribute to or affect the quality of the measured quality variable. The OMS 102 may use statistical processing to determine the amount of influence and/or contribution each process variable has on a quality variable.

Additionally, the example OMS 102 may model and/or determine relationships between the measured process variables and/or quality variables associated with the process control system 106. These relationships between the measured process and/or quality variables may produce one or more calculated quality variables. A calculated quality variable may be a multivariate and/or linear algebraic combination of one or more measured process variables, measured quality variables, and/or other calculated quality variables. Furthermore, the OMS 102 may determine an overall quality variable from a combination of the measured process variables, measured quality variables, and/or calculated quality variables. The overall quality variable may correspond to a quality determination of the entire process and/or may correspond to a predicted quality of a resulting product of the process.

The example OMS 102 of FIG. 1 includes an analytic processor 114. The example analytic processor 114 utilizes descriptive modeling, predictive modeling, and/or optimization to generate feedback regarding the status and/or quality of the process control system 106. The analytic processor 114 may detect, identify, and/or diagnose process operation faults and predict the impact of any faults on quality variables and/or an overall quality variable associated with a quality of a resultant product of the process control system 106. Furthermore, the analytic processor 114 may monitor the quality of the process by statistically and/or logically combining quality and/or process variables into an overall quality variable associated with the overall quality of the process. The analytic processor 114 may then compare the values calculated for the overall quality variable and/or values associated with the other quality variables to respective thresholds. These thresholds may be based on the predetermined quality limits of the overall quality variable at different times within the process. For example, if an overall quality variable associated with a process exceeds a threshold for an amount of time, the predicted final quality of the resulting product may not meet quality metrics associated with the finished product.

If the overall quality variable and/or any other quality variables deviate from the respective thresholds, the analytic processor 114 may generate a fault indication within a process overview chart and/or a process variation graph that shows an explained and/or an unexplained variation (or variance) associated with the overall quality variable and/or may show a variable that generated the process fault. The example analytic processor 114 manages the analysis to determine a cause of one or more process faults by providing functionality that enables an operator to generate process quality graphs (e.g., combination graphs, microcharts, process variation graphs, variable trend graphs, graphics, etc.) that may display current and/or past values of measured process variables, measured quality variables, and/or calculated quality variables. Furthermore, the analytic processor 114 generates these graphs while the process is operating and continually updates and/or re-calculates multivariate statistics associated with each of the graphs as additional process control information is received by the OMS 102.

The analytic processor 114 may generate a contribution graph by calculating contributions of process variables and/or quality variables to the overall quality variable or the quality variable triggering the fault. The contributions of the process and/or quality variables may be displayed as an explained and/or an unexplained variation of each variable as a contribution to the variation associated with the overall quality and/or the quality variable associated with the fault.

Furthermore, the example analytic processor 114 may generate variable trend graphs for any of the selected process and/or quality variables that may have variations greater than a defined threshold. The variable trend graph may show values associated with the variable over a time of the process in relation to values of the variable during similar times in previous processes. By generating the contribution graph and/or the variable trend graphs, the analytic process 114 may also identify possible corrections to the process to mediate the detected fault. The variable trend graph may assist an operator to determine a cause of a process fault by providing an overlay of historical plots with associated variations (e.g., standard deviations) with the current value.

The analytic processor 114 may generate a quality prediction graph to determine the effect of the correction(s), if implemented, on the overall quality of the process. If the correction(s) maintain or improve the overall quality to within specified thresholds, the analytic processor 114 may indicate to the OMS 102 to implement the correction(s). Alternatively, the analytic processor 114 may send instructions to the controller 108 to implement the process correction(s).

Further, the example analytic processor 114 may generate a microchart upon determining a fault associated with an overall quality variable and/or any other quality variable. The microchart may include values of the process and/or quality variables at a specified time (e.g., a time associated with the process fault) in relation to a mean value and/or a standard deviation for each of the variables. Additionally, the microchart may include spark lines that indicate prior values associated with each of the process and/or quality variables. From the microchart, the example analytic processor 114 may enable an operator to determine and/or select one or more corrective actions to the process and/or determine if any of the corrections will improve the process such that the overall quality variable is predicted to be within the specified limits.

The example OMS 102 manages access and control to the process control data including the process variation graphs, contribution graphs, variable trend graphs, quality prediction graphs, and/or microcharts via an online data processor 116. Additionally, the online data processor 116 provides access to process control operators to view process control data, change and/or modify process control data, and/or generate instructions for field devices within the process control system 106.

The example plant 104 of FIG. 1 includes a router 120 and a local workstation 122 communicatively coupled to the online data processor 116 via a local area network 124 (LAN). Further, the example router 120 may communicatively couple any other workstations (not shown) within the plant 104 to the LAN 124 and/or the online data processor 116. The router 120 may communicatively couple to the other workstations wirelessly and/or via a wired connection. The router 120 may include any type of wireless and/or wired router as an access hub to the LAN 124 and/or the online data processor 116.

The LAN 124 may be implemented using any desired communication medium and protocol. For example, the LAN 124 may be based on a hardwired or wireless Ethernet communication scheme. However, any other suitable communication medium and protocol could be used. Furthermore, although a single LAN is shown, more than one LAN and appropriate communication hardware within the workstation 122 may be used to provide redundant communication paths between the workstation 122 and a respective similar workstation (not shown).

The LAN 124 is also communicatively coupled to a firewall 128. The firewall 128 determines, based on one or more rules, whether communication from remote workstations 130 and/or 132 is to be permitted into the plant 104. The example remote workstations 130 and 132 may provide operators that are not within the plant 104 access to resources within the plant 104. The remote workstations 130 and 132 are communicatively coupled to the firewall 128 via a Wide Area Network (WAN) 134.

The example workstations 122, 130 and/or 132 may be configured to view, modify, and/or correct one or more processes within the process control system 106. For example the workstations 122, 130 and/or 132 may include a user interface 136 that formats and/or displays process control information generated by the OMS 102. For example, the user interface 136 may receive generated graphs and/or charts or, alternatively, data for generating a process control graph and/or chart from the OMS 102. Upon receiving the graph and/or chart data in the respective workstation 122, 130, and/or 132, the user interface 136 may generate a display of a graph and/or a chart 138 that is relatively easy for an operator to understand. The example in FIG. 1 shows the workstation 132 with the user interface 136. However, the workstations 122 and/or 130 may include user interfaces 136.

The example user interface 136 may alert a process control operator to the occurrence of any process control faults within the process control system 106 and/or any other process control systems within the plant 104. Furthermore, the user interface 136 may guide a process control operator through an analysis process to determine a source of a process fault and to predict an impact of the process fault on the quality of the resultant product. The user interface 136 may provide an operator process control statistical information as the process is occurring, thereby enabling the operator to make any adjustments to the process to correct for any faults. By correcting for faults during the process, the operator may maintain a quality of the resulting product.

The example user interface 136, via the example OMS 102, may display the detection, analysis, corrective action, and quality prediction information. For example, the user interface 136 may display a process overview chart, a process variation graph, a microchart, a contribution graph, a variable trend graph, and/or a quality prediction graph (e.g., the graph 138). Upon viewing these graphs 138, the operator may select additional graphs 138 to view multivariate and/or statistical process information to determine a cause of a process fault. Additionally, the user interface 136 may display possible corrective actions to a process fault. The user interface 136 may then allow an operator to select one or more corrective actions. Upon a selection of a correction, the user interface 136 may transmit the correction to the OMS 102, which then sends an instruction to the controller 108 to make the appropriate correction in the process control system 106.

The example workstations 122, 130 and/or 132 of FIG. 1 may include any computing device including a personal computer, a laptop, a server, a controller, a personal digital assistant (PDA), a micro computer, etc. The workstations 122, 130 and/or 132 may be implemented using any suitable computer system or processing system (e.g., the processor system P 10 of FIG. 18). For example, the workstations 122, 130 and/or 132 could be implemented using a single processor personal computer, single or multi-processor workstations, etc.

The example process control environment 100 is provided to illustrate one type of system within which the example methods and apparatus described in greater detail below may be advantageously employed. However, the example methods and apparatus described herein may, if desired, be advantageously employed in other systems of greater or less complexity than the example process control environment 100 and/or the process control system 106 shown in FIG. 1 and/or systems that are used in connection with process control activities, enterprise management activities, communication activities, etc.

Figure 2:
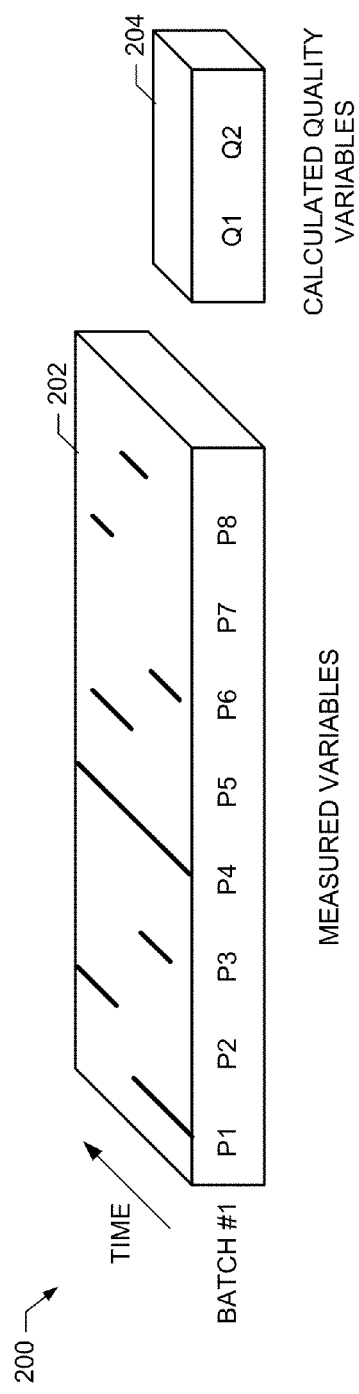
FIG. 2 represents a data structure for an example batch including process variables and quality variables.

FIG. 2 represents a data structure 200 for an example batch (e.g., Batch #1) including measured variables 202 and calculated quality variables 204. The example data structure 200 may also include an overall quality variable (not shown). Batch processing is a type of product manufacturing where a relatively large number of products and/or portions of products are created in parallel at one or more locations controlled by a routine. The routine may include one or more process stages, with each stage including one or more operations and each operation including one or more phases. In other examples, a process control system may utilize continuous processing to generate products. Continuous processing is similar to assembly line manufacturing where processes and/or operations each serially perform a single function on a single (or few) products at a time. While the methods and apparatus described herein refer to batch processes, any type of process may be implemented.

The example measured variables 202 include measured process and/or quality variables. For example, the variable P1 may correspond to a fluid flow rate (e.g., a process variable) and the variable P2 may correspond to a concentration of a fluid (e.g., a quality variable). The measured variables 202 are shown in connection with the batch process BATCH #1. The batch process occurs during a time period shown along the z-axis (e.g., TIME). Additionally, the batch process of FIG. 2 includes eight measured variables. However, in other examples, the batch process may include fewer or more measured variables.

FIG. 2 shows that each of the measured variables 202 is relevant for only certain times during the batch process. For example, the variable P1 is relevant from the start of the batch to a midway point through the batch. Thus, if the variable P1 is associated with a fluid flow rate, fluid may only be flowing during the batch process from the beginning of the batch to a midpoint of the batch. After this point, the batch may not utilize a fluid flow and thus, the variable P1 is not relevant to the batch process past this point. In contrast, the variable P4 is relevant for the entire batch process.

The example calculated quality variables 204 are associated with the entire batch process. The calculated quality variables 204 may be the result of a multivariate, statistical, and/or algebraic relationship between the measured variables 202 and/or other quality variables 204. For example, the quality variable Q1 204 may correspond to a composition quality of a resulting product from the batch process. The composition quality Q1 may be a quality variable because it may not be directly measurable within the process control system 106. Instead, the composition quality Q1 may be modeled and/or determined from a multivariate combination of the measured variables 202 P1, P3, P4 and P7. Thus, if the composition quality Q I exceeds a defined threshold, any one and/or combination of the measured variables P1, P3, P4 and/or P7 may be a contributing factor to the deviation.

Figure 3:
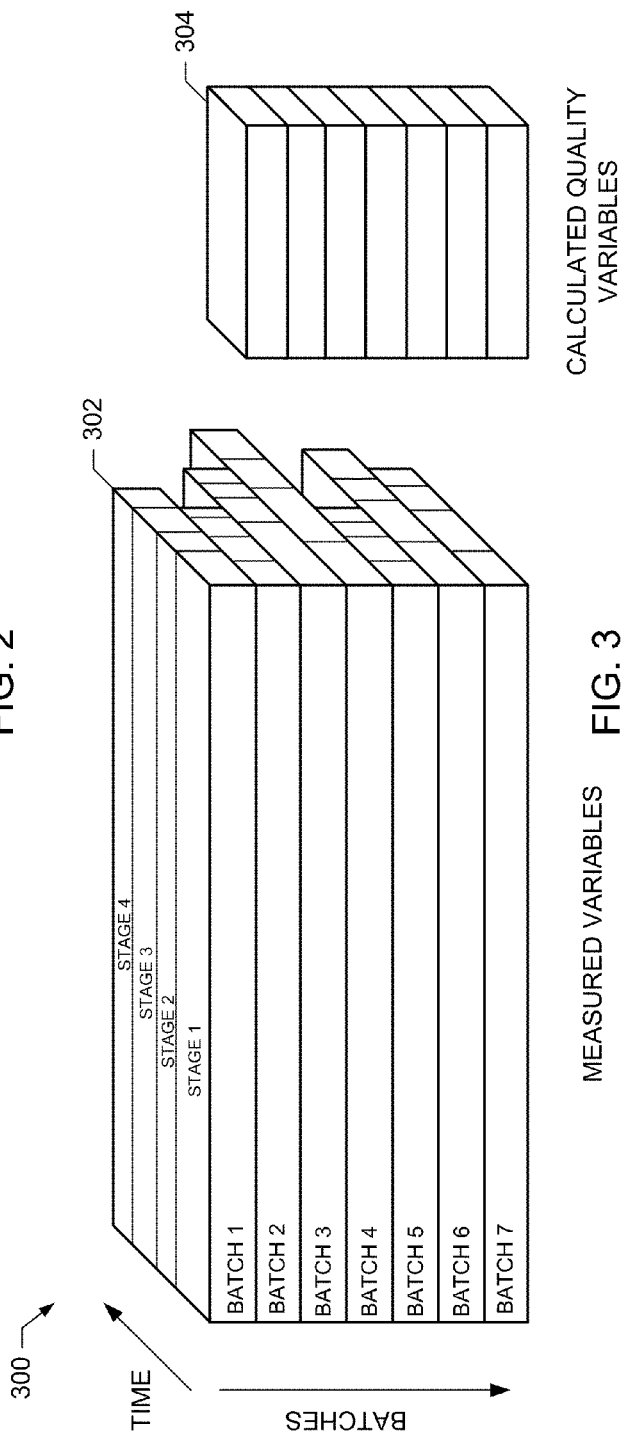
FIG. 3 represents a data structure for example batches including process variables and respective quality variables.

FIG. 3 represents a data structure 300 for example batches including process variables 302 and respective quality variables 304. The batches (e.g., BATCHES 1-7) show that a batch process includes stages (e.g., STAGES 1-4) that are executed in a serial order. For example, STAGE 1 may correspond to a combination and mixing of chemicals in a batch while STAGE 2 corresponds to a baking of those mixed chemicals in the batch. These stages may further be subdivided into operations, phases, and/or levels. Additionally, the calculated quality variables 304 correspond to the measured variables 302 at each batch.

The example in FIG. 3 shows that each batch may differ in time duration, with the start and finish of each stage differing between batches. For example, BATCH 2 is completed in a shorter time than BATCH 1, but BATCHES 3 and 4 are completed in a longer time than BATCH 1. Furthermore, BATCH 1 requires a longer time to complete STAGE 1 than BATCH 2. However, the relevant time duration of each variable (not shown) may be proportional to the length of time for the corresponding stage(s). Thus, the varying time to complete batches and/or stages may be resolved by the measured variables 302 within each batch. As a result of the proportional length of time of the measured variables, comparisons may be made between measured variable values between batches. For example, the value of the measured variable P1 at 50% through STAGE 1 of BATCH 1 should have substantially the same value as the value of the variable P1 at 50% through STAGE 1 of BATCHES 2-7.

Figure 4:
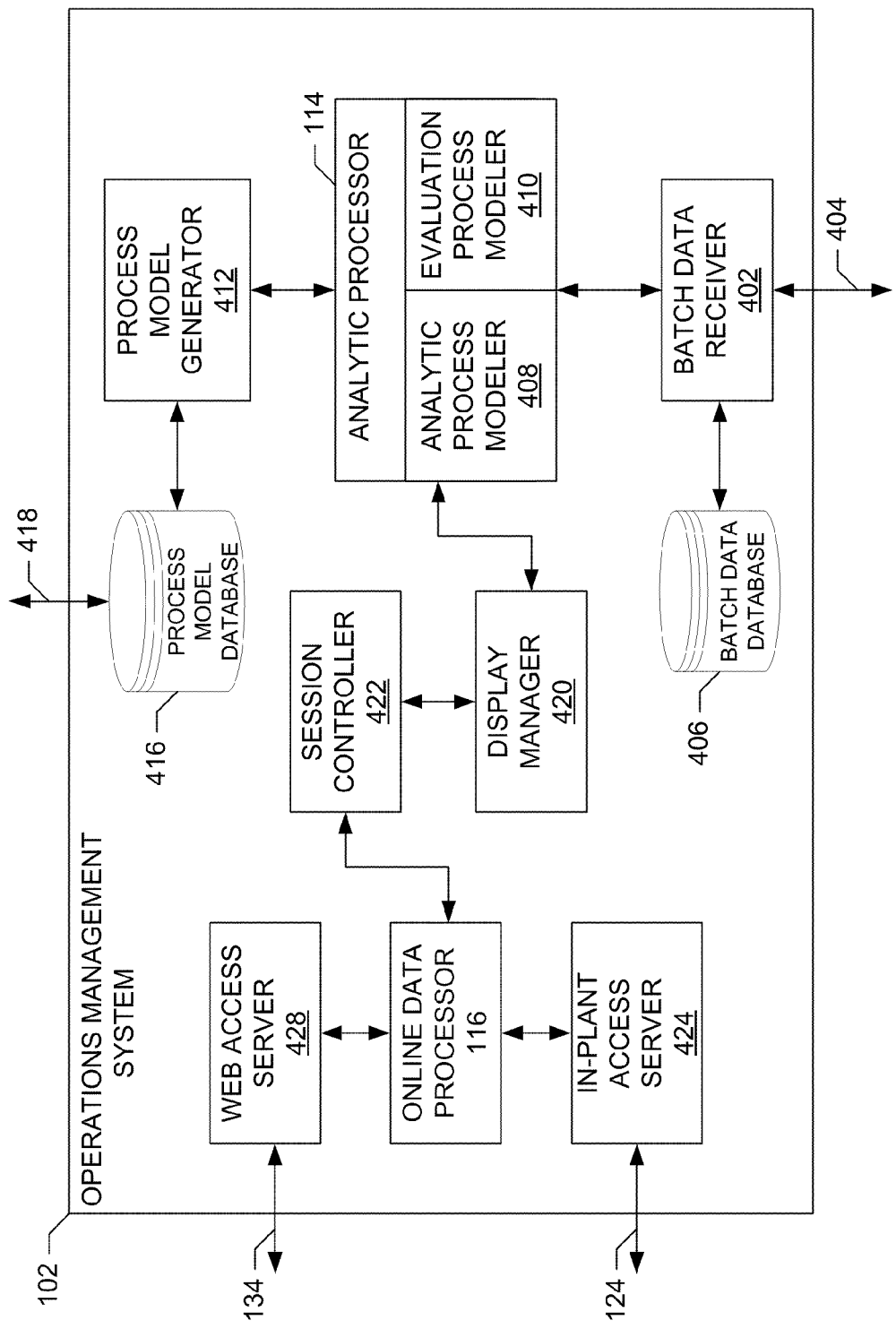
FIG. 4 is a functional diagram of the example operations management system of FIG. 1.

FIG. 4 is a functional diagram of the example operations management system (OMS) 102 of FIG. 1. The example OMS 102 processes process control information from the controller 108 of FIG. 1, determines models that relate variables associated with the process control system 106, calculates quality variables from the process control information, determines if any variables exceed respective thresholds, generates display information for user interfaces, and/or manages access to the process control information. Additionally, while the example OMS 102 of FIG.4 includes functional blocks configured to execute processes, the OMS 102 may combine functional blocks or include additional functional blocks. In some examples, the OMS 102 may be associated with a single process control system (e.g., the process control system 106) while in other examples the OMS 102 may process data from a plurality of process control systems. Additionally, while the OMS 102 is described as processing and managing batch data, the OMS 102 may be capable of processing and/or managing data associated with continuous, automated, and/ or manufacturing type processes.

To receive and process data from the controller 108, the example OMS 102 includes a batch data receiver 402. The example batch data receiver 402 receives process control information from the controller 108 via a communication path 404. The example communication path 404 may include any type of wired and/or wireless communication path. The process control information may include output data from the field devices within the process control system 106. This output data may be received by the batch data receiver 402 as values corresponding to measured process and/or quality variables originating from the field devices. In other examples, the process control data may be received as a data file including values corresponding to the outputs of the field devices. In these examples, the batch data receiver 402 may determine the corresponding measured variables that correspond to the values by noting the originating field devices. Further, the batch data receiver 402 may receive the process control information at periodic times from the controller 108, as the controller 108 receives the process control information, and/or by requesting the process control information from the controller 108.

Upon receiving the process control information, the example batch data receiver 402 of FIG. 4 organizes the values from the field devices by the corresponding variable and/or by the time the data was generated by the field devices. The batch data receiver 402 may also organize the values by a stage, an operation, a process, a batch number, and/or an event within the process control system 106. For example, the batch data receiver 402 may organize the values by a batch id (e.g., BATCH #7), a batch stage, (e.g., STAGE 2), a batch operation within the stage (e.g., heat), etc. Upon organizing the values corresponding to the measured variables, the batch data receiver 402 stores the organized information to a batch data database 406. Furthermore, the example batch data receiver 402 may access stored batch data and/or transmit batch data to the analytic processor 114. The batch data database 406 may be implemented by Electronically Erasable Programmable Read-Only Memory (EEPROM), Random Access Memory (RAM), Read-Only Memory (ROM), and/or any other type of memory.

The example analytic processor 114 manages the calculation, modeling, and/or fault determination associated with the process control system 106. The analytic processor 114 includes an analytic process modeler 408 to calculate values associated with calculated variables from the values associated with measured variables. The analytic process modeler 408 utilizes models of the process control system 106 to determine relationships among the measured process and/or quality variables and/or to determine relationships between the measured variables and calculated and/or overall variables. The analytic process modeler 408 calculates the values for the calculated and/or overall quality variables by including the values associated with the measured variables in the process models, processing the models with the measured values, and/or receiving the values associated with the calculated quality and/or overall quality variables as an output of the model. In other examples, the measured data may be organized within a graphical space that utilizes multivariate, optimization, geometric, and/or algebraic projections of the measured values to extract the values and/or generalizations that may be associated with the calculated and/or overall quality variables.

In example graphs that utilize variations, the example analytic process modeler 408 may calculate the variation of the current batch data by comparing the values associated with the current batch data (e.g., measured, calculated, and/or overall variables) with values associated with previous batches and/or with specified target values for the current batch data. The variation calculation may include applying a $T^2$ and/or a Q statistical test to the values associated with the measured and/or calculated variables. For example, the $T^2$ statistic may be used to determine an explained variation of process control variables while the Q statistic may be used to determine the acceptance of outlying values associated with the variables that correspond to an unexplained variation.

Additionally, the example analytic process modeler 408 may determine contribution amounts of measured variables with variations associated with measured, calculated, and/or overall quality variables. The analytic process modeler 408 may determine contribution amounts of the measured variables based on process models of the process control system 106. Based on these models, the analytic process modeler 408 may apply the measured variable values to the models, process the models, and/or identify a contribution factor of each variable.

Further, the analytic process modeler 408 may use values associated with measured, calculated, and/or overall variables to predict the quality of a process after the implementation of a correction. The analytic process modeler 408 may predict the quality by examining the current process variables and using predictive models that account for the correction and/or quality of past batches with similar data characteristics. Additionally, the analytic process modeler 408 may calculate statistical confidence ranges for the predicted quality that may show, for example, with 95% confidence what the quality of a resulting product may be.

The example analytic process modeler 408 of FIG. 4 may calculate overall and/or calculated variables, determine variable contribution amounts, predict process quality, and/or calculate variation statistics as process control information is received from the controller 108. In other examples, the analytic process modeler 408 may calculate overall and/or calculated variables, determine variable contribution amounts, predict process quality, and/or calculate variation statistics at predetermined time periods upon a request from a process control operator. Additionally, the analytic process modeler 408 may calculate overall and/or calculated variables, determine variable contribution amounts, predict process quality, and/or calculate variation statistics as a corresponding graph is utilized and/or requested by a process control operator viewing process control information in a user interface. For example, the analytic process modeler 408 may predict the process quality only when a process control operator selects to view a quality prediction graph. Alternatively, the analytic process modeler 408 may provide the overall and/or calculated variables, the variable contribution amounts, the predicted process quality, and/or variation statistics to other functional blocks within the OMS 102 for display to a process control operator. Further, the analytic process modeler 408 may transmit overall and/or calculated quality variables, variable contribution amounts, predicted process quality, and/or variation statistics to a user interface (e.g., the user interface 136) associated with a process control operator accessing the process control information.

The example analytic processor 114 of FIG. 4 includes an evaluation process modeler 410 to determine if any of the calculated quality values, process variations, variable contribution amounts, and/or predicted process quality values exceed a respective predefined threshold. The example evaluation process modeler 410 may receive the thresholds from a model associated with the process control system 106. Alternatively, the evaluation process modeler 410 may receive the thresholds from a process control operator. These thresholds may be based on maximum and/or minimum metrics and/or values that ensure a product of the process control system 106 conforms to quality standards.

The example evaluation process modeler 410 may also generate fault indications if a measured, calculated, and/or overall variable value exceeds a threshold. Additionally, the evaluation process modeler 410 may generate a fault indication if a variation associated with a measured, calculated, and/or overall variable exceeds a threshold. Upon generating a fault indication, the evaluation process modeler 410 may transmit the fault indication to another functional block within the OMS 102 and/or to a user interface within a workstation that is accessing process control data related to the fault. Additionally, the evaluation process modeler 410 may predict process faults based on trends of measured and/or calculated variable values and/or the variations associated with these variables. For example, the evaluation process modeler 410 may determine a process fault may occur based on a long term increase in values of a measured variable. If the evaluation process modeler 410 determines that a process fault may occur, the evaluation process modeler 410 may generate a predictive fault indication.

Additionally, the evaluation process modeler 410 may determine if a quality prediction calculation from the analytic process modeler 408 exceeds or falls outside quality limits. Further, the evaluation process modeler 410 may determine if the any of the confidence ranges of the predicted quality exceed or otherwise fail to satisfy a corresponding quality threshold. If some of a confidence range exceeds a quality threshold, the evaluation process modeler 410 may send a predictive fault indication. The predictive fault indication may inform a process control operator that a corrective action may not bring the process within quality control thresholds or limits. As a result of a predictive fault indication, a process control operator may decide to save time by terminating a process and/or restart the process because the resulting product may not meet the quality standards, metrics, and/or thresholds.

The example evaluation process modeler 410 of FIG. 4 may determine if any variable values, variations, and/or quality predictions exceed or fail to meet or satisfy a threshold upon each instance of the OMS 102 receiving process control data from the controller 108. Alternatively, the evaluation process modeler 410 may determine if any variable values, variations, and/or quality predictions exceed a threshold at predetermined time periods and/or upon request from a process control operator.

To determine process models of the process control system 106, the example OMS 102 of FIG. 4 includes a process model generator 412. The example process model generator 412 determines models that are utilized by the analytic process modeler 408, the analytic processor 114, and/or the evaluation process modeler 410. The models may define relationships between measured variables, quality variables and/or overall process quality, thresholds for the measured variables, quality variables and/or overall process quality, and/or graphical display types for the measured variables, quality variables and/or overall process quality.

The example process model generator 412 may construct and/or determine a process model by receiving a list of the field devices within the process control system 106, the inputs and/or outputs associated with each field device, the arrangement of the field devices, and/or the interconnection between the field devices. Additionally, the process model generator 412 may utilize past process relationships between some field devices to predict relationships between the field devices and/or outputs of the field devices. These relationships may also be determined by utilizing multivariate statistical methodologies to analyze the data from field devices to determine relationships and/or contributions based on interconnections between the field devices. Multivariate analysis may include discriminate analysis, principle components analysis, projection to latent structures analysis, and/or multivariate process control analysis. In addition to multivariate analysis, the process model generator 412 may utilize exploratory data analysis, control and capability analysis, regression analysis, correlation analysis, analysis of variance analysis (e.g., ANOVA), repeatability analysis, reproduction analysis, and/or time series analysis.

The past relationships, multivariate analysis, and/or statistical analysis may be used by the process model generator 412 to determine thresholds for each of the measured variables, calculated variables, predicted quality values, variations, etc. The thresholds may also be determined through experimentation, design prototyping, design for failure effects analysis, pre-production process control system prototyping, process control operator calculations, and/or any other method that may accurately predict and/or calculate process quality.

Additionally, the process model generator 412 may determine relationships between variables by analyzing functional diagrams, algorithms, routines, and/or any other type of command structure that defines the control and/or operation of the process control system 106. Also, process control operators may define relationships between variables based on experience and/or calculations performed outside of the process model generator 412. Further, the process model generator 412 may determine conditions to apply corrective actions to correct a process fault by analyzing previous batch data with faults and effects of corrective action(s). Additionally, the corrective actions may be determined by linking inputs to a field device to the measured variables that may be the cause of the fault. For example, if a flow rate is determined to be a cause of a fault, the process model generator 412 may determine that the flow rate may be adjusted by a valve and/or a pump. Thus, changing an input to the valve and/or pump may be determined to be a corrective action for a deviating flow rate. Alternatively, process model generator 412 may receive corrective actions from a process control operator.

In addition, the process model generator 412 may use any multivariate and/or statistical methods to determine the relationship between measured and/or calculated variables with an overall process quality. The process model generator 412 may also use any multivariate and/or statistical methods to determine a model that predicts process quality based on corrections to the process control system 106. The quality prediction models may be based on applying a corrective action to past data with a projection analysis based on past batches with similar data characteristics. Also, the process model generator 412 may use any multivariate and/or statistical methods to determine a model that predicts if any variables will exceed a threshold based on past batch data trends.

Furthermore, the process model generator 412 may determine variations and/or contributions of measured variables to quality variables from the modeled data by determining measured process disturbances quantified through an application of the Hotelling $T^2$ statistic and/or unmeasured disturbances through an application of the Q statistic (e.g., Squared Prediction Error (SPE)). Additionally, the models determined by the process model generator 412 may group values associated with measured variables by individual normal conforming batches that may be clustered within a specified range of values and/or by non-conforming batches that may be outside the clustered range.

In addition to determining models for relationships between measured and/or calculated variables, the example process model generator 412 determines graph types based on a modeled relationship type. The graph types may generally be constructed by a process control operator that determines an appearance, data display, data types, and/or interface options for each graph. The example process model generator 412 may then populate each type of graph with the corresponding data types. For example, the process model generator 412 may include measured variables to be displayed within a microchart, process variation data and/or corresponding variables to be displayed within a process variation graph, and measured and/or calculated variables and contribution relationships to be displayed within a contribution graph.

The example process model generator 412 of FIG. 4 may store the models, relationships, and/or thresholds to a process model database 416. The process model database 416 may be accessed by a process control operator via a communication path 418 to view, modify, and/or add information to any of the models, relationships, and/or thresholds. The communication path 418 may be any type of wired and/or wireless communication path. The process model database 416 may be implemented by EEPROM, RAM, ROM, and/or any other type of memory.

The example process model generator 412 may provide the models, relationships, and/or thresholds to the analytic process modeler 408 and/or the evaluation process modeler 410 upon request from an operator. Alternatively, the analytic process modeler 408 and/or the evaluation process modeler 410 may access the models, relationships, and/or thresholds stored in the process model database 416 via the process model generator 412 as they are needed. Furthermore, the process model generator 412 may update each model, relationship, and/or threshold as process control information is received by the OMS 102.

To manage the display of variable values within a user interface, the example OMS 102 of FIG. 4 includes a display manager 420. The example display manager 420 receives measured variable values, calculated variable values, calculated variations, calculated contributions, thresholds, graph type information and/or fault indications from the analytic processor 114. Upon receiving the information, the display manager 420 organizes the information by graph type for display within a user interface. For example, if a workstation (e.g., the workstation 130 of FIG. 1) accesses the OMS 102 using a web application, the example display manager 420 displays one or more graphs within the user interface.

The display manager 420 may display a graph by combining generated graph information from the analytic process modeler 408 and/or the analytic processor 114 with a user interface application. For example, the display manager 420 may insert a generated graph into a Rich Internet Application (RIA) built using Silverlight™, Adobe Flash™, Hypertext Mark-Up Language (HTML) 5, or any other similar plug-in based rich Internet application technology to provide a web server framework for process control operators, engineers, and/or management. The display manager 420 enables interactive browsing based applications that do not need a deployment of specialized process control software beyond any workstation that includes a Silverlight and/or a Flash plug-in. The display manager 420 enables direct manipulation of the data within the graphs from a workstation without the workstation having to continuously access the OMS 102. Direct manipulation of the graphs may include visual feedback of points on a curve, a pan and/or a zoom of a graph, and/or displaying related graphs. Alternatively, in examples where a specialized application is needed to view the graphs, the display manager 420 may provide that application with the data associated with the generated graph.

To manage which process control operator is accessing which process control data, the example OMS 102 includes a session controller 422. In some examples, the session controller 422 may be combined with the display manager 420 as a web server. The example session controller 422 initiates a new session for each process control operator that accesses the data and/or graphs generated by the analytic processor 114. By creating a new session for each operator, the session controller 422 ensures that only process control data related to the process accessed by the operator is transmitted to the operator. For example, four different operators may be accessing the OMS 102 to view data associated with four different processes. Further, the session controller 422 may manage sessions when more than one operator is viewing process data and/or graphs associated with the same process.

Additionally, the session controller 422 may track the data displayed within a user interface on a workstation. In this manner, if a workstation loses a connection with the OMS 102, the session controller 422 stores the last location of the workstation for use when the workstation is able to reconnect. Furthermore, the session controller 422 may manage the transmission of information to a user interface. For example, upon an operator opening a session, the session controller 422 may transmit an overview chart and/or any process variation graphs to the workstation. Then, the session controller 422 may transmit any contribution graphs, variable trends graphs, and/or microcharts.

To manage the communication of process control information to workstations, the example OMS 102 of FIG. 4 includes the online data processor 116. The example online data processor 116 may resolve in-plant communications and/or web based communications into a single protocol for communicating with the session controller 422, the display manager 420, and/or the analytic processor 114. Additionally, the online data processor 116 may include security and/or user authentication functionally to ensure only registered workstations and/or process control operators may access the process control data and associated graphs.

To communicate with workstations within the plant 104, the example OMS 102 includes an in-plant access server 424. The in-plant access server 424 may include components and/or connectivity to couple to the LAN 124 of FIG. 1. Additionally, the in-plant access server 424 may include encryption and/or any other data transmission security to ensure the transmitted data may not be viewed by unauthorized individuals. The in-plant access server 424 may be accessed by any workstation, laptop, personal digital assistant (PDA), smartphone, and/or any other device that is capable of displaying the process control data and associated graphs.

To communicate with workstations exterior to the plant 104, the example OMS 102 includes a web access server 428. The web access server 428 may include components and/or connectivity to couple to the WAN 134 of FIG. 1. Additionally, the web access server 428 may include encryption and/or any other data transmission security to ensure the transmitted data may not be viewed by unauthorized individuals.

While an example manner of implementing the OMS 102 is depicted in FIG. 4, one or more of the interfaces, data structures, elements, processes and/or devices illustrated in FIG. 4 may be combined, divided, rearranged, omitted, eliminated and/or implemented in any other way. For example, the example batch data receiver 402, the example analytic processor 114, the example analytic process modeler 408, the example evaluation process modeler 410, the example process model generator 412, the example display manager 420, the example session controller 422, the example online data processor 116, the example in-plant access server 424, and/or the example web access server 428 illustrated in FIG. 4 may be implemented separately and/or in any combination using, for example, machine-accessible or readable instructions executed by one or more computing devices and/or computing platforms (e.g., the example processing platform P10 of FIG. 18).

Further, the example batch data receiver 402, the example analytic processor 114, the example analytic process modeler 408, the example evaluation process modeler 410, the example process model generator 412, the example display manager 420, the example session controller 422, the example online data processor 116, the example in-plant access server 424, the example web access server 428 and/or, more generally, the OMS 102 may be implemented by hardware, software, firmware and/or any combination of hardware, software and/or firmware. Thus, for example, any of the example batch data receiver 402, the example analytic processor 114, the example analytic process modeler 408, the example evaluation process modeler 410, the example process model generator 412, the example display manager 420, the example session controller 422, the example online data processor 116, the example in-plant access server 424, the example web access server 428 and/or, more generally, the OMS 102 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 5:
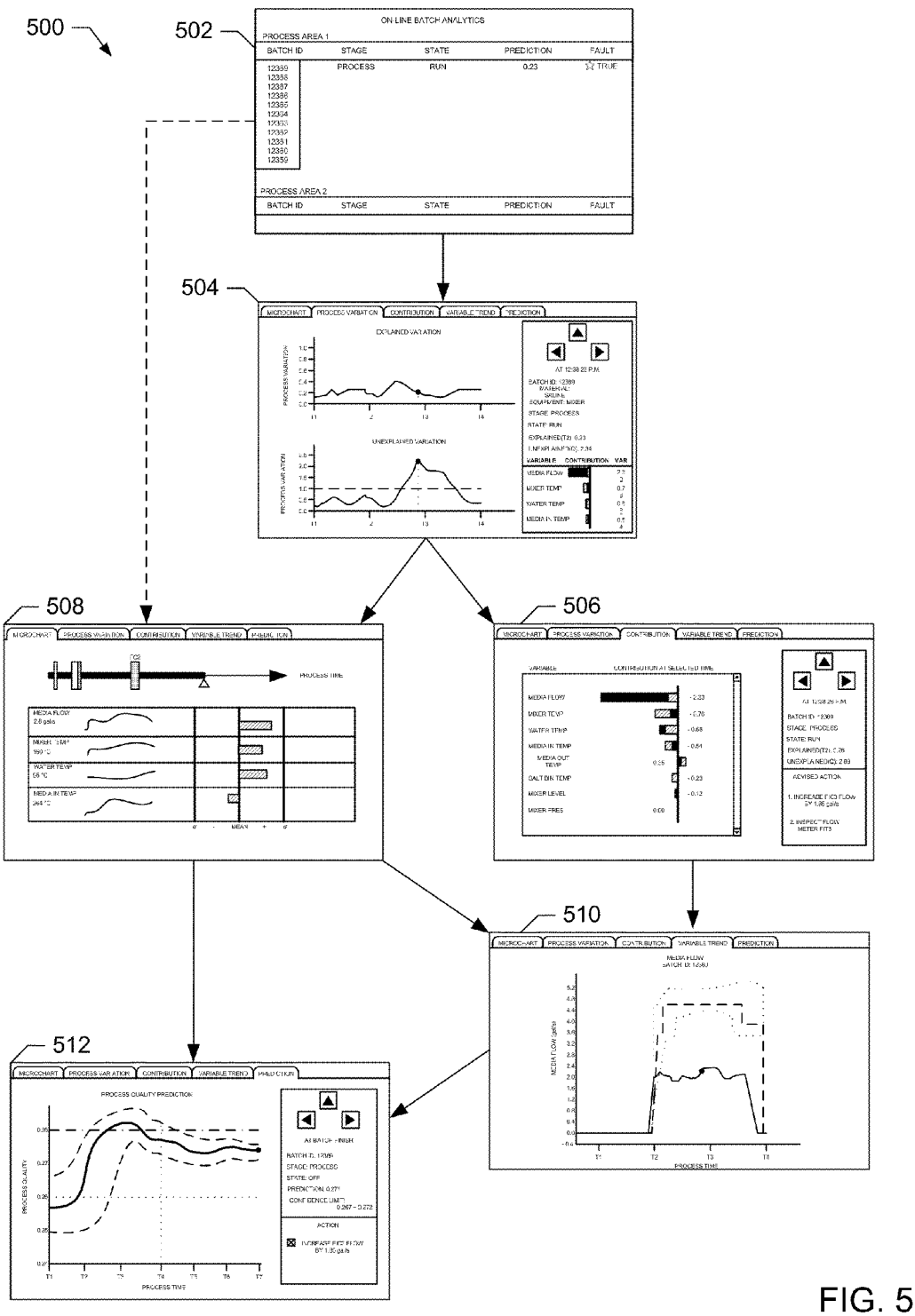
FIG. 5 is a diagram that represents charts and/or graphs generated by the operations management system of FIG. 1 that may be displayed to determine a fault within the process control system.

FIG. 5 is a diagram 500 that represents charts and/or graphs 502-512 generated by the OMS 102 of FIGS. 1 and/or 4 that may be displayed to determine a fault within the process control system 106. The diagram 500 shows how relatively easily a process control operator may navigate logically from an initial detection of a process fault, to determining a cause of the fault, then to determining if a corrective action for the fault may improve an overall process quality. The diagram 500 shows two possible flows to determine a fault and/or predict process quality with the correction of the fault. However, other charts, graphs, diagrams, and/or data may be displayed. An explanation for each of the charts and/or graphs 502-512 is provided in conjunction with FIGS. 6-14B.

A process overview chart 502 shows the status or one or more process control systems (e.g., the process control system 106). The overview chart 502 may be displayed when a process control operator initially opens a user interface on a workstation and selects a process control environment and/or plant. If the OMS 102 detects a fault and/or a prediction of a process fault, the OMS 102 may indicate the fault within the overview chart 502.

Upon viewing the indication of a fault in the overview chart 502, a process control operator may select the indication to open a process variation graph 504. Alternatively, the operator may select the indication to open a microchart 508. The process variation graph 504 may show the variation associated with the indicated fault. For example, if the process fault is associated with the overall process quality, the process variation graph 504 may display the unexplained and/or the explained variation associated with the overall process quality. Alternatively, if the fault is associated with a measured and/or calculated variable, the process variation graph 504 may display the explained and/or unexplained variation associated with the measured and/or calculated variable. Furthermore, the process variation graph 504 may display the current and past values of the variable and/or process quality associated with the fault in relation to a mean value, a standard deviation of the value and/or a threshold of the value. The process variation graph 504 may also show a bar chart with measured and/or calculated variable contributions to the variation.

Upon viewing the process variation graph 504, the process control operator may select a point on the graph corresponding to a time. Upon selecting a point, a contribution graph 506 may be displayed. The contribution graph 506 shows variables that contribute to the process and/or variable variation. The operator may use the contribution graph 506 to determine which variables contribute to the identified fault. Thus, the contribution graph 506 shows the potential causes for the detected fault. Further, the process control operator can change a time in the process to view the values of variables at the selected time. Additionally, the contribution graph 506 may display advised corrective actions for the fault. The operator may select any of the listed variables in the contribution chart 504 to view a history of the variable for the current batch process in a variable trend graph 510.

Alternatively, upon the operator selecting a point on the process variation graph 504, the microchart 508 may be displayed. The example microchart 508 shows values associated with measured and/or calculated variables based on a selected time. The operator may use the microchart 508 to examine the values of measured and/or calculated variables over the history of the batch process to determine if, when, and/or by how much one or more variables exceeded thresholds and/or standard deviations. The microchart 508 may also include spark lines showing a history of measured and/or calculated values. The operator may select any of the spark lines to view a more detailed description of the selected spark line. Further, the microchart 508 may include a timeline showing the time at which a process fault occurred. The operator may select an arrow within the timeline and scroll and/or select a time within the timeline to display the corresponding measured and/or calculated variable values at that time. The operator may select any one of the displayed variables to open the variable trend graph 510. Alternatively or additionally, the operator may open a quality prediction graph 512 to display the predicted process quality based on an implemented of one or more corrective actions.

The example variable trend graph 510 displays variable values over the duration of a batch process. In some examples, the variable trend graph 510 may display variable values over a stage and/or an operation of the batch process depending on a resolution selected by the operator. The example variable trend graph 510 may show the history of the selected variable during the batch process in relation to an average and/or a standard deviation of previous batch processes. The variable trend graph 510 may also display thresholds and/or calculated standard deviations for the selected variable. The operator may use the variable trend graph 510 to view a history of a variable during the batch process. Upon viewing the variable trend graph 510, the operator may select the quality prediction graph 512.

The example quality prediction graph 512 shows the predicted quality of the process based on the implementation of one or more corrective actions. The operator may use the quality prediction graph 512 to determine if a corrective action will improve the process quality enough to continue executing the process. If predicted the process quality does not improve and/or if the process quality has already deviated significantly from acceptable limits, the operator may decide to terminate the process. Additionally, if a selected corrective action is not predicted to improve the process, the operator may select additional corrective actions to determine if one or more corrective actions may improve the quality of the process. If a corrective action is predicted to improve the process quality to within acceptable variations, the operator may select within the quality prediction graph 512 to transmit the corrective action to the OMS 102 and/or the controller 108.

The quality prediction graph 512 may also show the predicted variation of the overall quality variable and/or a measured and/or calculated variable associated with a fault. Further, the quality prediction graph 512 may show a predicted quality of the process and current and/or past variations of the process quality. Upon viewing the quality prediction graph 512, the operator may return to the overview chart 502. Additionally, after viewing any of the graphs 504-510, the operator may return to the overview chart 502 and/or open any of the other graphs 504-512. Furthermore, the graphs and/or charts 502-512 may be updated with current variable values and/or quality predictions as the OMS 102 receives and/or processes process control information.

FIG. 6 shows the user interface 136 displaying the example process overview chart 502 of FIG. 5 associated with the example process control system 106 of FIG. 1. The overview chart 502 may be used to provide an overview of multiple processes in a plant (e.g., the plant 104) where more than one batch may be active at a time. The overview chart 502 is organized by process area and includes a state of a first process area (e.g., Process Area 1) and a second process area (e.g., Process Area 2). The first process area may correspond to the process control system 106. Each process area includes information associated with current and/or previous batches that may be used to alert a process control operator when a fault is detected and/or when an end of a batch quality prediction variable is outside of a specified threshold.

The example overview chart 502 includes batch information for batches 12359-12369. However, only the batch information for batch 12369 is shown. The example overview chart 502 includes fields for a batch identification number (e.g., Batch ID), a stage of the batch (e.g., Stage), a state of the stage (e.g., State), a predicted quality value (e.g., prediction), and/or a fault status (e.g., fault). The predicted quality value may correspond to a predicted variation of an overall quality variable associated with a quality of a resultant product. The fault field may display if a fault has been detected and/or if a fault is predicted. The fault field may also display a time the fault occurred and/or any other process information related to the fault (e.g., measured and/or calculated variables that be a cause of the fault). Additionally, the fault field may include an icon 604 to graphically alert an operator to a fault.

An operator may view additional information related to the fault by selecting the icon 604, the text in the fault field (e.g., True), the batch number, and/or any other text in the fields associated with the batch 12369. Alternatively, an operator may view additional information associated with the fault by selecting a forward arrow (not shown) and/or a graph tab (not shown) that may be located within the overview chart 502. Furthermore, an operator may alert other process control operators and/or managers to the detected fault by selecting text and/or the icon 604 associated with the fault.

Figure 7:
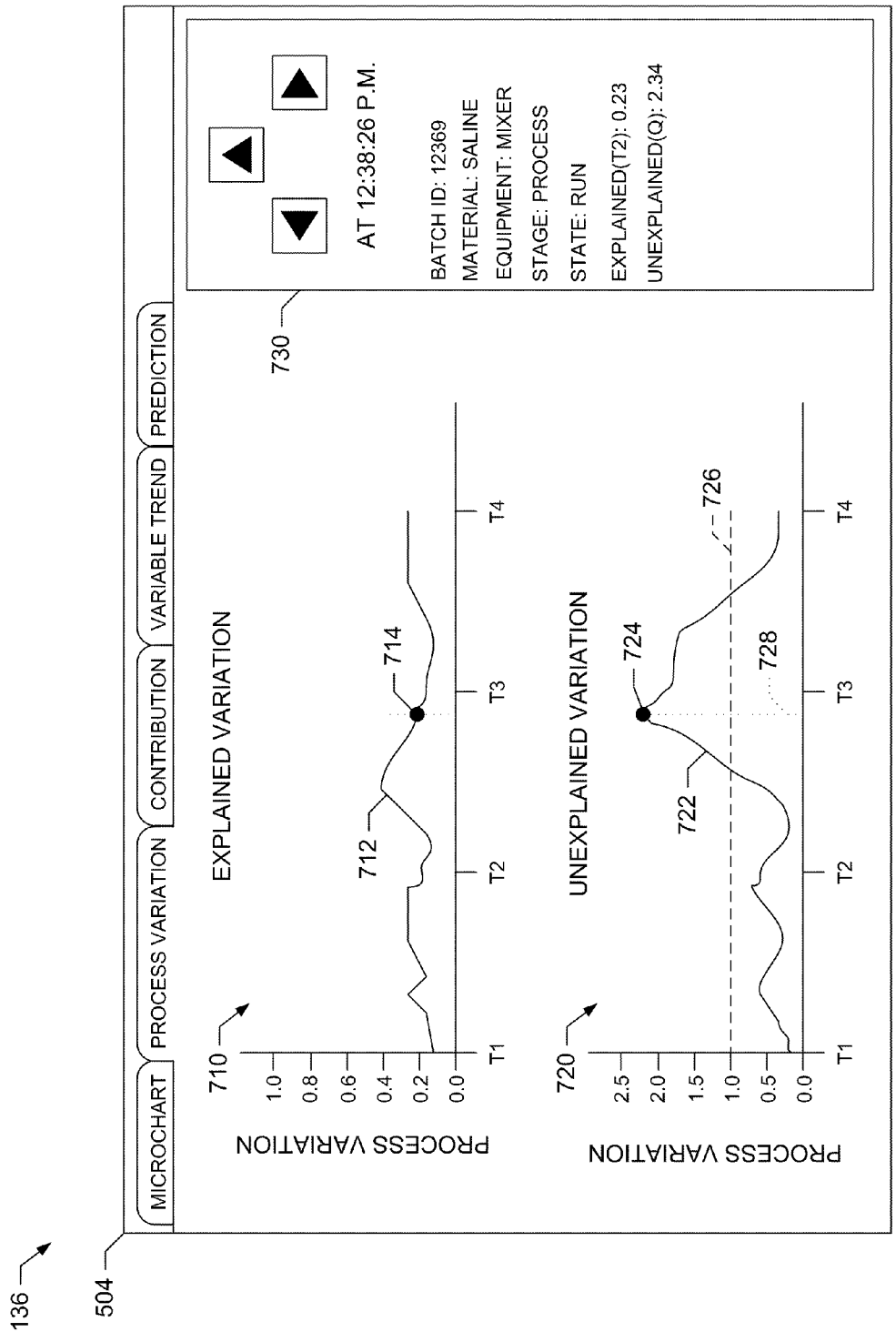
FIG. 7 shows the user interface of FIG. 6 displaying an example process variation graph including unexplained and explained variation graphs for the example batch process of FIG. 6.

FIG. 7 shows the user interface 136 of FIG. 6 displaying the example process variation graph 504 of FIG. 5 including an explained variation graph 710 and an unexplained variation graph 720 for an overall quality of the batch process 12369. The process variation graph 504 may be displayed by clicking on the batch 12369 information within the overview chart 502 of FIG. 6.

The example process variation graph 504 shows calculated statistics for the batch 12369 for a time associated with a process time period (e.g., T1 to T4). A process control operator may select the time period to include a batch, a stage, an operation, and/or a time period around a detected fault. The example in FIG. 7 shows process quality variation. However, other process variation graphs may show variations associated with measured, calculated and/or overall quality variables. Additionally, instead of showing variations of variables, the process variation graph may show values of the variables over the process time period.

The explained variation graph 710 shows a variation curve 712 of explained variation values for the process time period. Similarly, the unexplained variation graph 720 shows a variation curve 722 of unexplained variation values for the process time period. Point selections 714 and 724 indicate a point on the respective variation graphs 710 and 720 selected by an operator. For example, in FIG. 7, the point selection 724 shows that the operator selected the greatest point of unexplained variation. Alternatively, upon selecting a fault in the overview chart 502, the process variation graph 504 may open with the point selections 714 and/or 724 displayed on a highest point of variation. A threshold line 726 includes a limit of 1.0. A fault may be indicated if the unexplained variation curve 722 exceeds the threshold line 726. For example, the fault indicated in the overview chart 502 may be associated with the unexplained variation curve 722 of the overall quality of the batch exceeding the 1.0 threshold at 12:38:26 P.M. just before T3. A time indication line 728 references a time during the time period associated with the time corresponding to the point selections 714 and/or 724.

Furthermore, the process variation graph 504 includes a process information faceplate 730 that includes navigation arrows, a time corresponding to the time of the point selections 714 and/or 724 (e.g., 12:38:26 P.M.), a batch identification number, material being processed by the batch, equipment currently in use by the batch, a stage of the batch, and a state of the batch. Additionally, the faceplate 730 includes numerical values of the explained and unexplained variations at the respective point selections 714 and/or 724. An operator may move the point selections 714 and/or 724 along the respective curves 712 and 722 to see the corresponding numerical variation values in the faceplate 730.

The operator may select one or more of the arrows to navigate between the graphs and/or charts 502-512 of FIG. 5. For example, by clicking on a forward arrow (e.g., the arrow above P.M.), the contribution graph 506 may be displayed or, by clicking on the up and/or reverse arrows, the overview chart 502 may be displayed. Additionally, the operator may navigate between the graphs 504-512 by selecting the corresponding tab located at the top of the process variation graph 504. For example, the operator may view a microchart (e.g., the microchart 508) by selecting the microchart tab. Additionally, the operator may navigate to the contribution graph 506 and/or the microchart 508 by selecting a point on the curves 712 and/or 722 (e.g., the point selections 714 and/or 724). Further, the time associated with the point selected on the curves 722 and/or 724 may be forwarded to the contribution graph 506 and/or the microchart 508.

Figure 8:
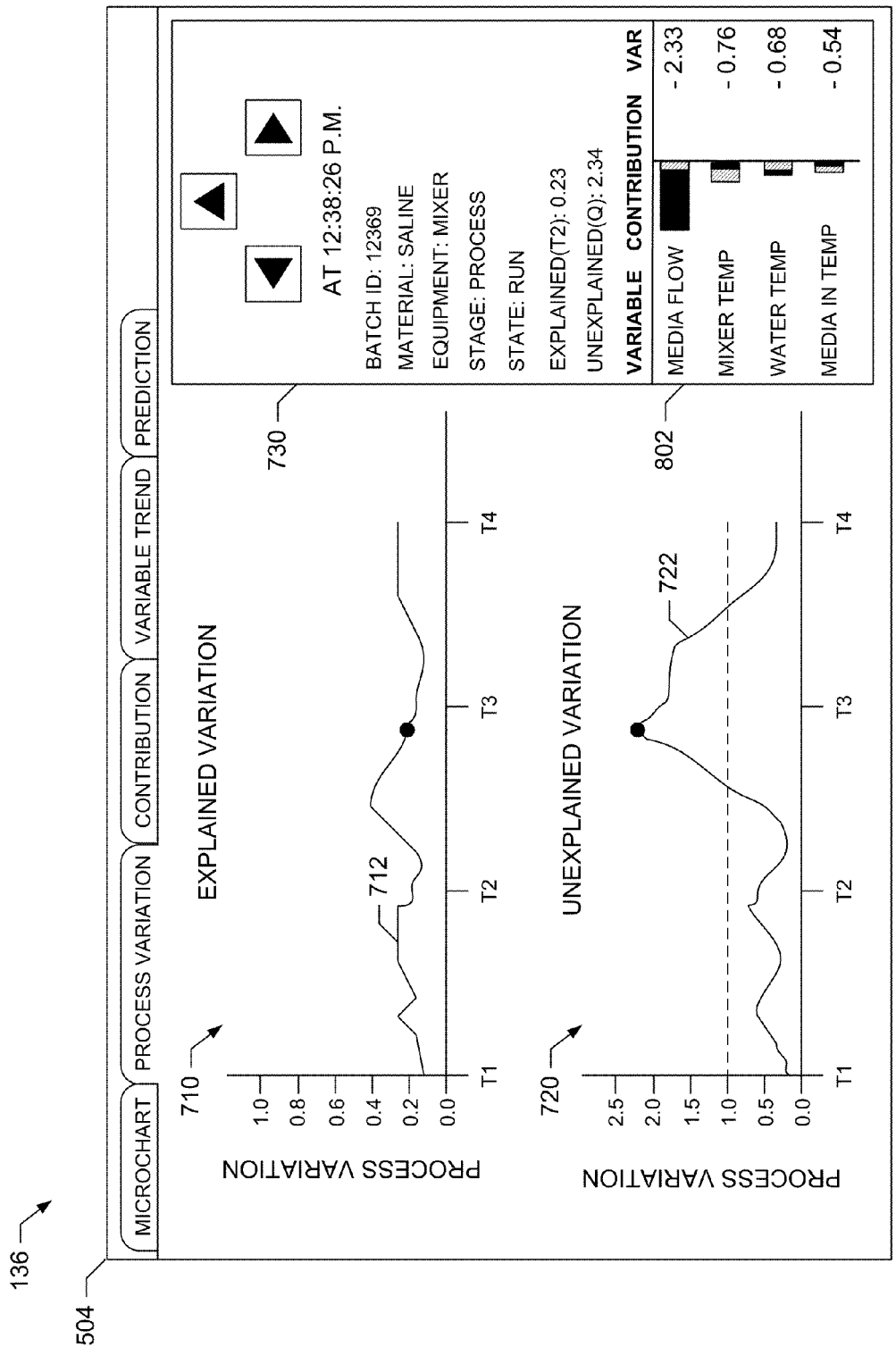
FIG. 8 shows the user interface of FIG. 7 displaying the example process variation graph including a summary contribution faceplate.

FIG. 8 shows the user interface 136 of FIG. 7 displaying the example process variation graph 504 including a summary contribution faceplate 802. The process variation graph 504 includes the explained variation graph 710, the unexplained variation graph 720, the variation curves 712 and 722, and the process information faceplate 730 similar to FIG. 7. The summary contribution faceplate 802 includes a contribution graph with variables that contribute to the explained and/or the unexplained variation. The contribution graph bar chart shows the value of the variable in relation to how much the variable contributes to the explained and/or the unexplained portion of the overall quality variation. Additionally, the contribution graph shows a value associated with a contribution amount and/or a variation amount of that variable.

For example, the Media Flow variable may be a measured process variable that contributes the most to the unexplained variation. The unexplained contribution amount may be indicated by a solid black bar portion and the explained contribution amount may be indicated by the striped bar portion. Additionally, the value of the Media Flow variable may indicate the media flow is 2.33 gallons (gal)/second (sec) below a Media Flow threshold. Alternatively, the 2.33 may indicate a statistical confidence value and/or a statistical contribution value of the Media Flow variable to the overall process quality variation. The contribution of each variable may be modeled and/or calculated by the OMS 102 of FIGS. 1 and/or 4.

An operator may select a point of the curves 712 and/or 722. When the operator selects a point of the curve, the contribution information within the summary contribution faceplate 802 may change to reflect the contributions to the variation of each variable at the time selected. For example, if a point is selected at time T2, the Media Flow may show lower explained and/or unexplained contribution values because variation of the overall process quality at time T2 is lower. Additionally, similar to FIG. 7, an operator may select the forward arrow in the process information faceplate 730, the tabs and/or by selecting the summary contribution faceplate 802 to open the contribution graph 506 and/or the microchart 508.

Figure 9:
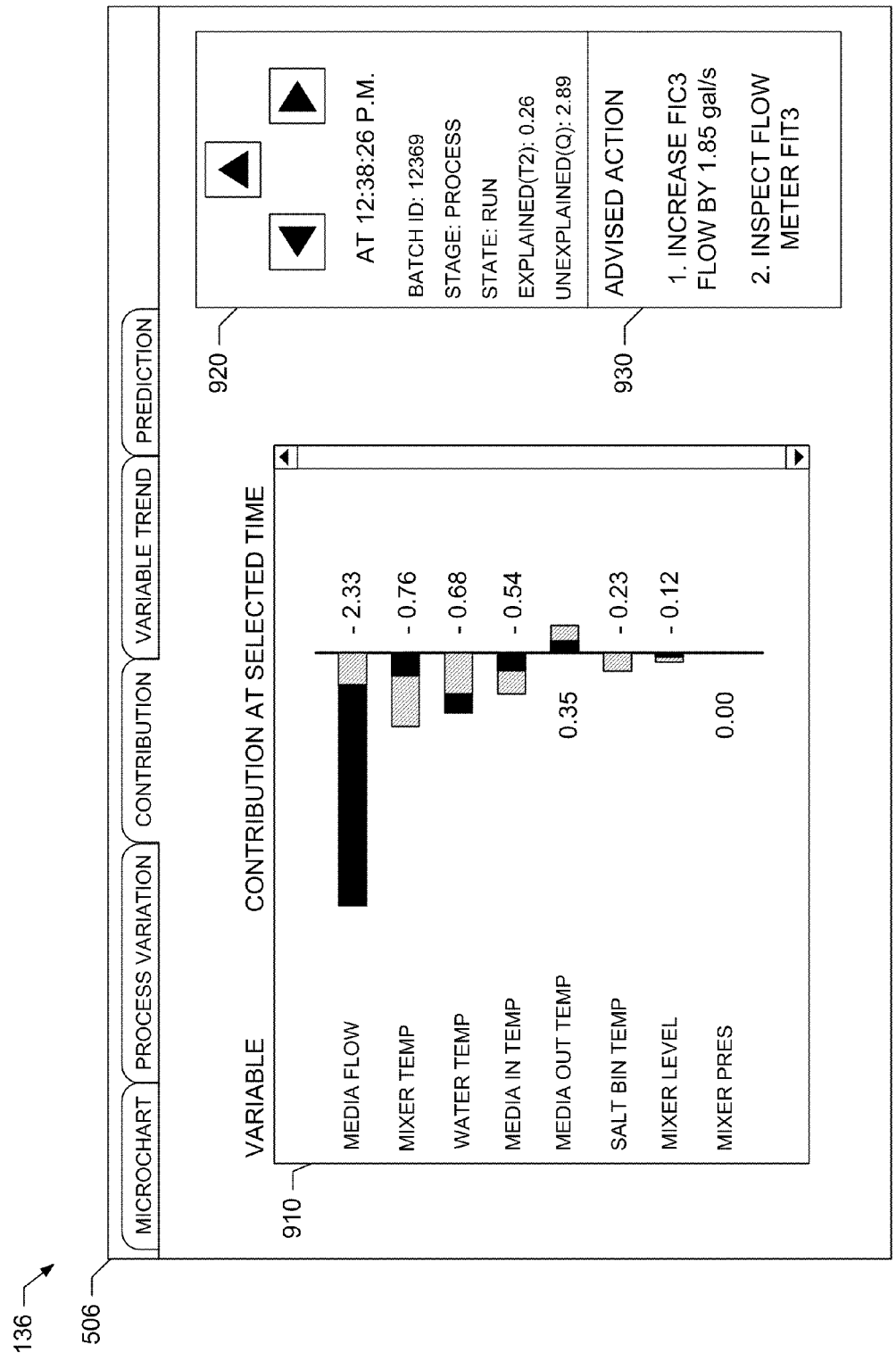
FIG. 9 shows the user interface of FIG. 6 displaying an example contribution graph including unexplained and explained process variations for variables associated with the process control system of FIG. 1.

FIG. 9 shows the user interface 136 of FIG. 6 displaying the example contribution graph 506 of FIG. 5 including unexplained and explained process variations for variables associated with the process control system 106 of FIG. 1. The example contribution graph 506 includes a bar chart 910 that displays explained variations (e.g., solid black bars or bar portions) and unexplained variations (e.g., striped bars or bar portions) for each variable that contributes to the overall process quality variation. In other examples, the bar charts may be shown as different colors and/or shapes. Additionally, the variables (e.g., Media Flow, Mixer Temp, Water Temp, etc) are organized with by the variable with the greatest contribution to the overall process variation displayed at the top. In other examples, the variables may be organized by preferences of a process control operator.

The variables within the bar chart 910 include a numerical value associated with a variation of the variable. For example, the −2.33 value associated with the Media Flow variable may indicate that a fluid is flowing 2.33 gal/sec slower than a mean value or a threshold value. Alternatively, the −2.33 value may indicate a statistical contribution amount that the Media Flow variable contributes to the variation of the overall process quality variation of the FIGS. 7 and 8. The contribution amounts of the variables in the bar chart 910 may be determined by the OMS 102 of FIG. 1.

The explained and unexplained variations for each variable are superimposed or shown together to provide an easy graphical display for a process control operator. The explained variations of each variable may be calculated by the OMS 102 by utilizing a model variation $T^2$ statistic. The unexplained variation of each variable may be calculated by the OMS 102 by utilizing a Q statistical test. In other examples, the bar chart 910 may display values of the variables at the selected time, mean values of the variables and/or standard deviations for each of the variables.

The example contribution graph 506 includes a process information faceplate 920 that displays process information, process time of the displayed variations for each variable, and numerical values of explained and unexplained variations for a selected variable. For example, in FIG. 9 the process information faceplate 920 shows that at 12:38:26 the Media Flow variable has a 0.26 variation and a 2.89 unexplained contribution to the overall process variation displayed in FIGS. 7 and 8. The contribution graph 506 may show the variable variations for the 12:38:26 P.M. time based on a time received from the process variation graph 504. Alternatively, an operator may change the process time by selecting any one of the arrows to advance forward or backward in time. By changing the time, the bar chart 910 may display variable variation values corresponding to the selected time.

Furthermore, the contribution graph 506 includes an advised action faceplate 930. The advised action faceplate 930 may display process correction recommendations to remediate a detected process fault (e.g., the detected fault in FIG. 6). For example, the advised action faceplate 930 recommends correcting the fault by increasing the media flow by 1.85 gal/s in the field device FIC3. FIC3 may correspond to a valve or a pump within the process control system 106 that is capable of modifying the Media Flow rate. Additionally, the advised action faceplate 930 includes a recommendation to inspect a Flow Meter FIT3. By inspecting the Flow Meter FIT3, an operator may determine if the Flow Meter is outputting an accurate Media Flow value. The advised actions displayed in the faceplate 930 may be determined by prior analysis of similar process control systems with similar faults. Additionally, the advised actions may be determined by the OMS 102 based on modeling of the process control system 106.

An operator may view a history of values for each of the variables by selecting the desired variable in the bar chart 910. Upon selecting a variable, the variable trend graph 510 is displayed showing a history of the selected variable. Alternatively, the operator may select a variable, then select the Variable Trend tab and/or select the forward arrow in the process information faceplate 920. Additionally, the operator may display the quality prediction graph 512 by selecting one or more of the advised actions in the advised actions faceplate 930 to view the predicted quality if the one or more corrective actions are implemented.

Figure 10:
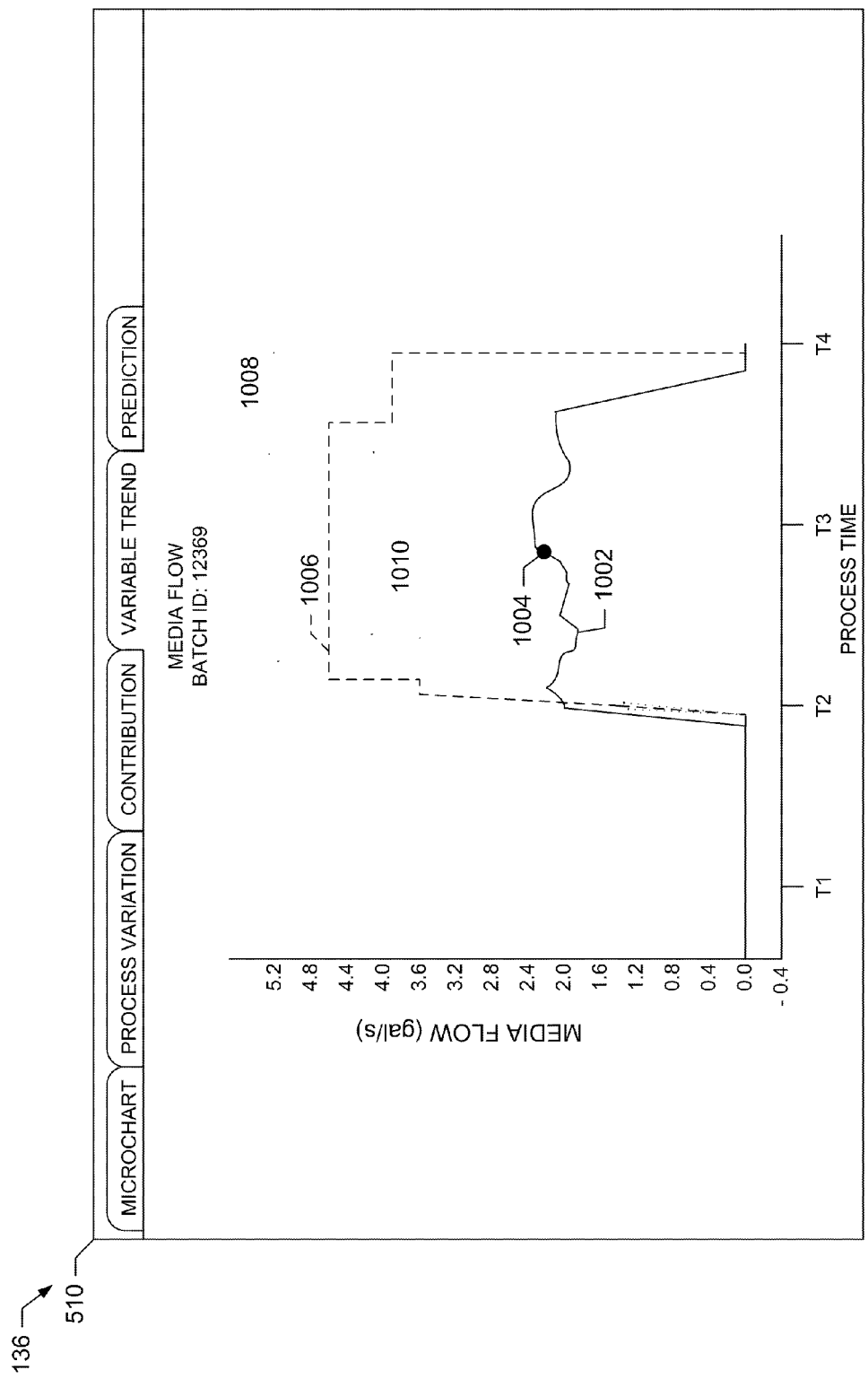
FIG. 10 shows the user interface of FIG. 6 displaying a variable trend graph for the Media Flow variable of FIGS. 8 and 9.

FIG. 10 shows the user interface 136 of FIG. 6 displaying the variable trend graph 510 of FIG. 5 for the Media Flow variable of FIGS. 8 and 9. The variable trend graph 510 may be used by a process control operator to compare a process variable trend during the current batch process to trends of the variable during previous batch processes that finished with a product within quality thresholds. Abnormal deviations in a variable from past batches may be a source of detected faults and/or deviations in overall quality variables and/or overall process quality variations. The variable trend graph 510 shows how values associated with a current batch for a variable have deviated from previous batches. Multiple variable trend graphs 510 may be opened by an operator to display the history trends of multiple variables. The example variable trend graph 510 may display a history of values for any measured variable, calculated quality variable, and/or overall process quality variable.

The example variable trend graph 510 includes a current variable curve 1002 with a selection point 1004. The current variable curve 1002 shows values of the variable over a time period of the process (e.g., T1 to T4). The time period may be adjusted by the operator to only include a stage, an operation, and/or a time around a fault detection. The current variable curve 1002 shows that the media flow began in the batch process before time T2 and exhibited a flow rate between 1.7 and 2.4 gal/sec until approximately midway through time T3. By time T4, the media flow in the batch process 12369 had stopped.

The variable trend graph 510 includes a variable mean 1006, an upper standard deviation 1008, and a lower standard deviation 1010 corresponding to Media Flow values for past processes. Additionally, the variable trend graph 510 may include a calculated mean, calculated standard deviations, and/or a threshold for the Media Flow. By displaying the variable mean 1006 and standard deviations 1008 and 1010, the example variable trend graph 510 enables an operator to compare the trend of a variable to previous trends of the same variable during different batches that yielded an acceptable product. The variable mean 1006 and/or the standard deviations 1008 and 1010 may be determined by the OMS 102 of FIG. 1.

The variable mean 1006 may be a determined mean value of the Media Flow variable for past batches, and the standard deviations 1008 and 1010 may be determined from standard deviations of the Media Flow variable for past batches. The variable trend graph 510 in FIG. 10 shows that the current variable curve 1002 is roughly 2.0 gal/sec below the variable mean 1006 and 1.6 gal/sec below the lower standard deviation.

Furthermore, the variable trend graph 510 may include a process information faceplate and/or an advised action faceplate. An operator may access the quality prediction graph 512 by selecting a point on the variable curve 1002 (e.g., the selection point 1004), by selecting the Prediction tab, and/or by selecting a corrective action in an advised action faceplate. Alternatively, the operator may navigate back to the contribution graph 506 by selecting the Contribution tab and/or by closing the variable trend graph 510.

Figure 11:
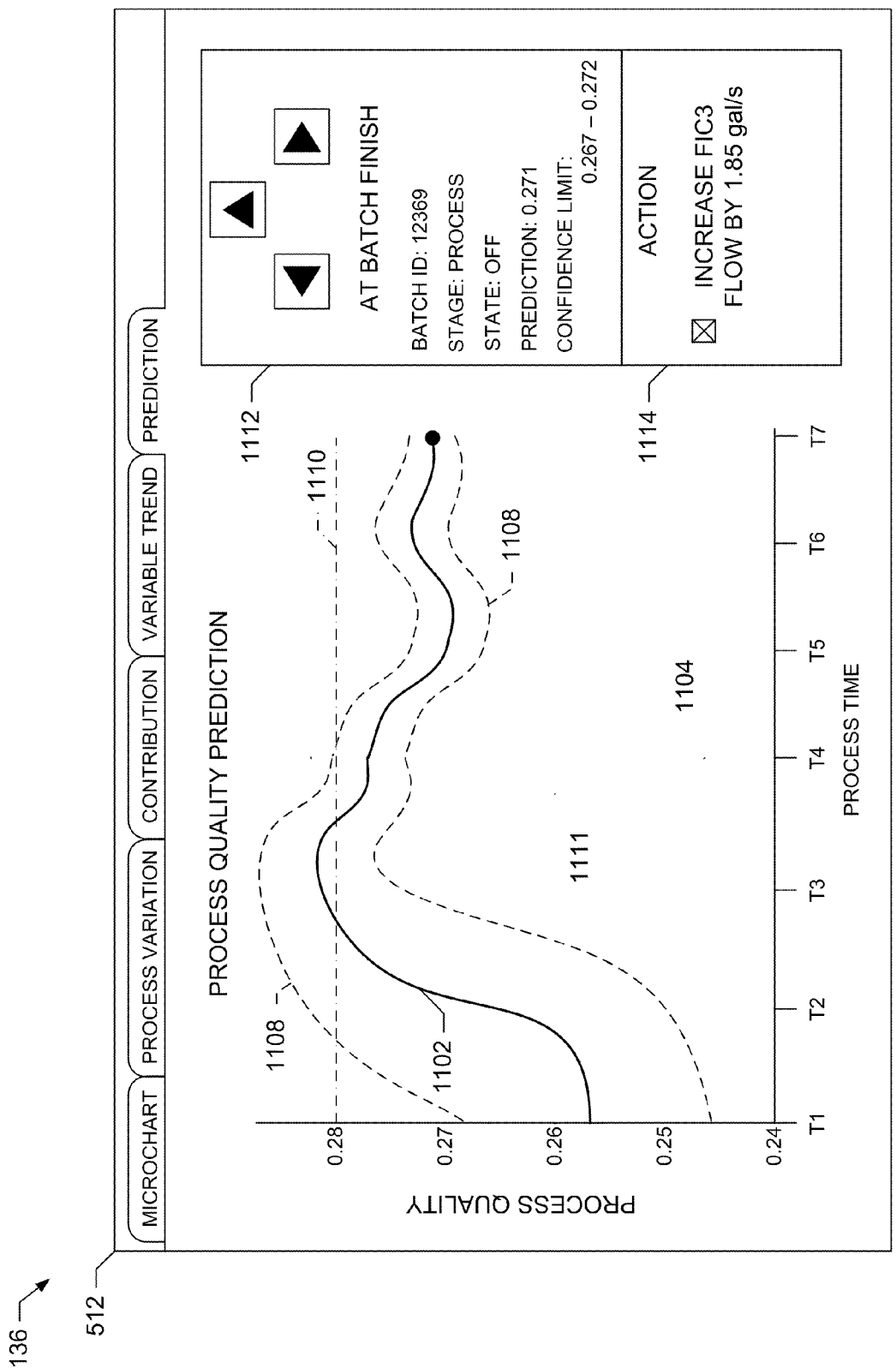
FIG. 11 shows the user interface of FIG. 6 displaying a quality prediction graph for the example batch of FIG. 6

FIG. 11 shows the user interface 136 of FIG. 6 displaying the quality prediction graph 512 of FIG. 5 for the example batch 12369. The example quality prediction graph 512 shows an impact of possible corrections to a fault on process variation (e.g., the process variation shown in the process variation graph 504 of FIG. 7). The quality prediction graph 512 may show a predicted quality of a product resulting from the process and/or a predicted quality associated with the end of the batch process 12369. Additionally, the quality prediction graph 512 may show a predicted quality of the batch process after an implementation of a corrective action to mediate a detected fault. An operator may use the quality prediction graph 512 to determine if a corrective action is sufficient to bring process quality within defined thresholds. If the quality prediction graph 512 shows that a corrective action is not sufficient to produce a quality product, the operator may select other corrective actions and/or may decide to terminate the process.

Further, the quality prediction graph 512 may correspond to an overall quality variable. In other examples, the quality prediction graph 512 may show predicted values for a measured and/or a calculated variable after an implementation of a corrective action. The example quality prediction graph 512 of FIG. 11 includes a quality prediction curve 1102 over a complete time period for the batch process 12369 (e.g., from T1 to T7). The quality prediction curve 1102 may be represented as a statistical process quality calculation that may be normalized. The statistical process quality calculation and/or a model of the statistical process quality calculation may be generated by the example OMS 102 of FIG. 1.

The example quality prediction graph 512 also includes a time marker line 1104 that indicates the current time and/or progress though the batch process. Additionally, the time marker line 1104 may represent a time at which the quality prediction graph 512 calculates the effects of applying a corrective action to the batch process. Furthermore, the quality prediction graph 512 includes confidence limits 1108 that represent a calculated confidence range for the predicted quality. For example, the confidence limits 1108 may indicate with 95% confidence that the actual quality of the batch process will be included within the confidence limits 1108. In other words, there is a 95% chance the quality of the batch process will lie at some point between the confidence limits 1108. The example confidence limits 1108 are wide at the start of the batch process 12369 because the quality of the process may be more uncertain at the beginning of the process. Then, as the batch process progresses, the quality of the process may be more certain, which is indicated by narrowed confidence limits 1108 at the time T7.

Furthermore, the quality prediction graph 512 of FIG. 11 includes a threshold (e.g., specification) limit 1110 and a target limit 1111. The threshold limit 1110 may indicate a maximum value the quality prediction curve 1102 may be to have the batch process considered as an acceptable quality. The target limit 1111 may indicate an ideal value for the quality prediction curve 1102 to yield an acceptable quality product.

The example quality prediction graph 512 also includes a process information faceplate 1112 that includes navigation arrows, batch process information, a predicted numerical value of a selected point on the curve 1102 of the batch process quality, and numerical values of the confidence limits 1108 associated with the selected point on the curve 1102. The selected point on the predicted quality curve 1102 may be represented by the black circle at time T7. Additionally, the quality prediction graph 512 includes an advised action faceplate 1114 that includes a selectable corrective action. In the example of FIG. 11, the corrective action of increasing the FIC3 flow by 1.85 gal/s is selected indicating that the quality prediction graph 512 has applied that corrective action to the prediction of the batch process quality. In other examples, the advised action faceplate 1114 may include additional corrective actions and/or may include functionality that enables an operator to enter corrective actions.

If a process control operator determines that an applied corrective action fixes a detected fault, the process control operator may apply the corrective action to the process control system 106 of FIG. 1 by selecting the action within the advised action faceplate 1114. Alternatively, the operator may select the corrective action to apply through other functionality included within the user interface 136 and/or the quality prediction graph 512.

Figure 12:
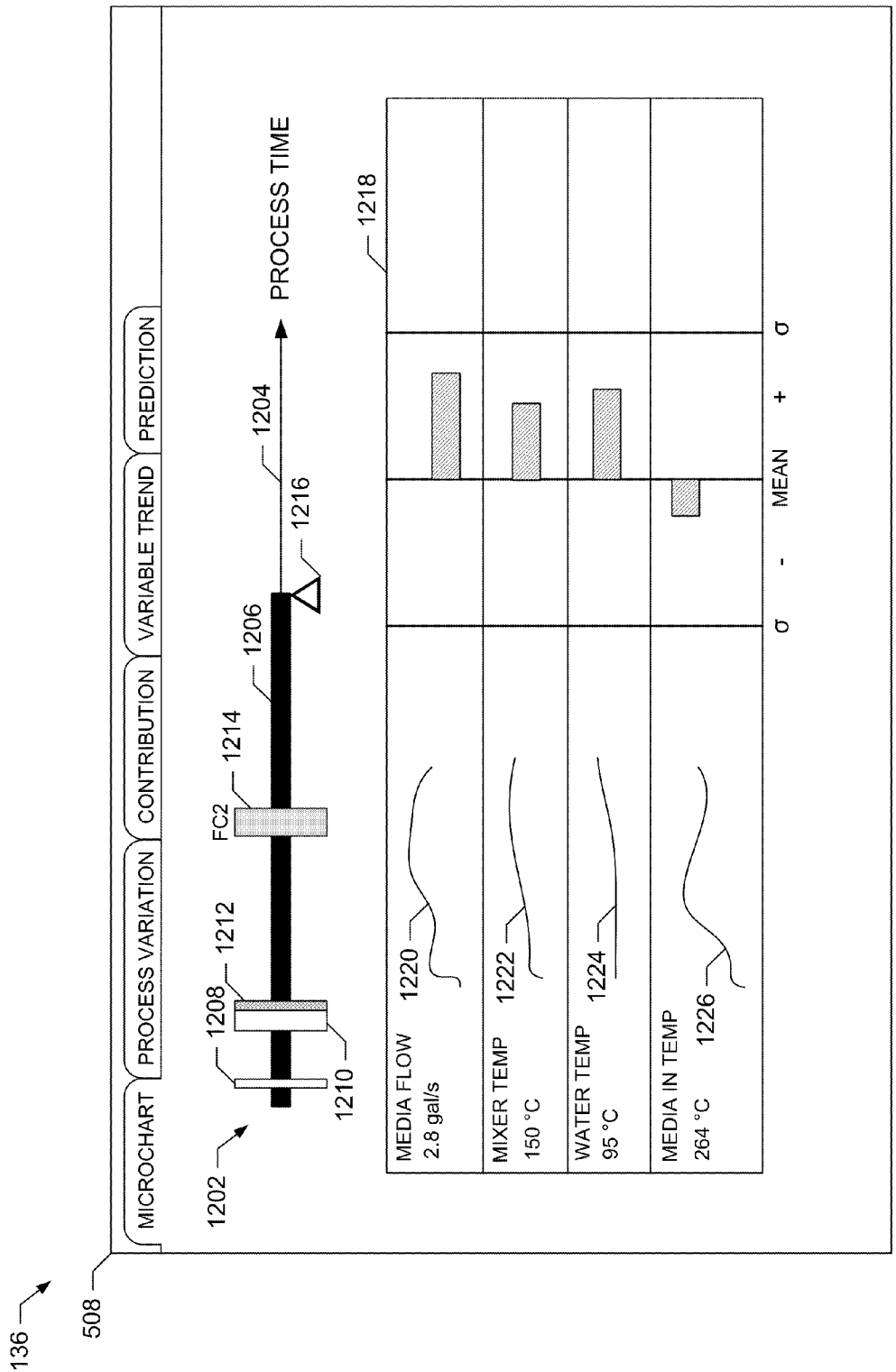
FIG. 12 shows the user interface of FIG. 6 displaying an example microchart at a first time including spark lines and a bar chart for some of the variables of FIG. 9.

FIG. 12 shows the user interface 136 of FIG. 6 displaying the example microchart 508 of FIG. 5 at a first time. The example microchart includes a timeline 1202 that shows a batch process time 1204 and a current progression 1206 through the batch process time 1204. Additionally, the timeline 1202 includes detected faults 1208-1214 and a plot time position arrow 1216. The process time 1204 corresponds to a time to complete a batch process (e.g., the batch process 12369). The current progression 1206 shows the status of the batch process in relation to the process time 1204. For example, in FIG. 12, the current progression is roughly two-thirds through the process time 1204. In other examples, the process time 1204 may correspond to a stage time, an operation time, and/or a time specified by an operator.

The detected faults 1208-1214 correspond to faults detected within the process control system 106 of FIG. 1. The duration of the detected faults 1208-1214 may be indicated by a width of the detected fault 1208-1214 bars. Additionally, the shading of the detected faults 1208-1214 may correspond to a type of fault. For example, the faults 1208 and 1210 may correspond to an operating condition (e.g., a quality variable) of the batch process that exceeds a threshold. The fault 1212 may correspond to a fault associated with a measurement, a control loop operation, and/or a field device (e.g., measured variables). The fault 1214 may correspond to a combination of a fault corresponding to an operating condition and a fault corresponding to a measurement, a control loop operation, and/or a field device. In other examples, the detected faults 1208-1214 may be represented by colored bars, by shapes, and/or by icons.

The timeline 1202 includes the plot time position arrow 1216 to enable an operator to select a time during the batch process to view variable value information. The variable value information may be displayed within a bar chart 1218 and/or within spark lines 1220-1226. The microchart 508 of FIG. 12 shows the plot time position arrow 1216 positioned at a first time and, the variable values shown in the bar chart 1218 correspond to the first time period. Additionally, the progress of the spark lines 1220-1226 is shown through the first time period. Furthermore, the variables include a name of the variable and a numerical value of the variable at the first time. For example, the first variable, Media Flow, includes the spark line 1220 showing a history of values for the Media Flow variable during the batch process, a first time value of 2.8 gal/s, and a bar chart 1218 that is normalized showing how the 2.8 gal/s relates to a mean value for the Media Flow variable.

The example microchart 508 provides a process control operator current variable values (e.g., via the bar chart 1218) and a history of the variable values (e.g., via the spark lines 1220-1226) for each of the variables that may contribute to the variation of the batch process. Thus, the example microchart 508 combines the functionality of the contribution graph 506 and the variable trend graph 510.

The example microchart 508 may normalize and/or rescale the mean and/or the standard deviation of each of the variables so that the variables may be displayed within a common mean and/or a common standard deviation of the bar chart 1218. The bars within the bar chart 1218 may change colors to indicate if one or more variables exceed the standard deviation but do not create a process fault. Additionally, the bars within the bar chart 1218 may change colors to indicate if one or more variables exceed the standard deviation and cause a process fault. Furthermore, the bars within the bar chart 1218 may be shaded to indicate a statistical history of each of the variables. For example, similar to a mean and a standard deviation of previous batches within the variable trend chart 510 of FIG. 10, the bars within the bar chart 1218 may be shaded to indicate a mean and/or a standard deviation of previous batches for each variable. Furthermore, an operator may select any one of the variables within the bar chart 1218 to view the selected variable in the variable trend graph 510.

The example spark lines 1220-1226 show a history of previous values for the current batch for each of the variables. The spark lines 1220-126 may be plotted along a mean value for each variable and/or may be shown as an absolute value of the variables. Furthermore, the spark lines may include indications that show where during the process the values of a variable exceeded a threshold. A process control operator may view detailed information of the spark lines 1220-1226 by selecting a desired spark line 1220-1226.

Figure 13:
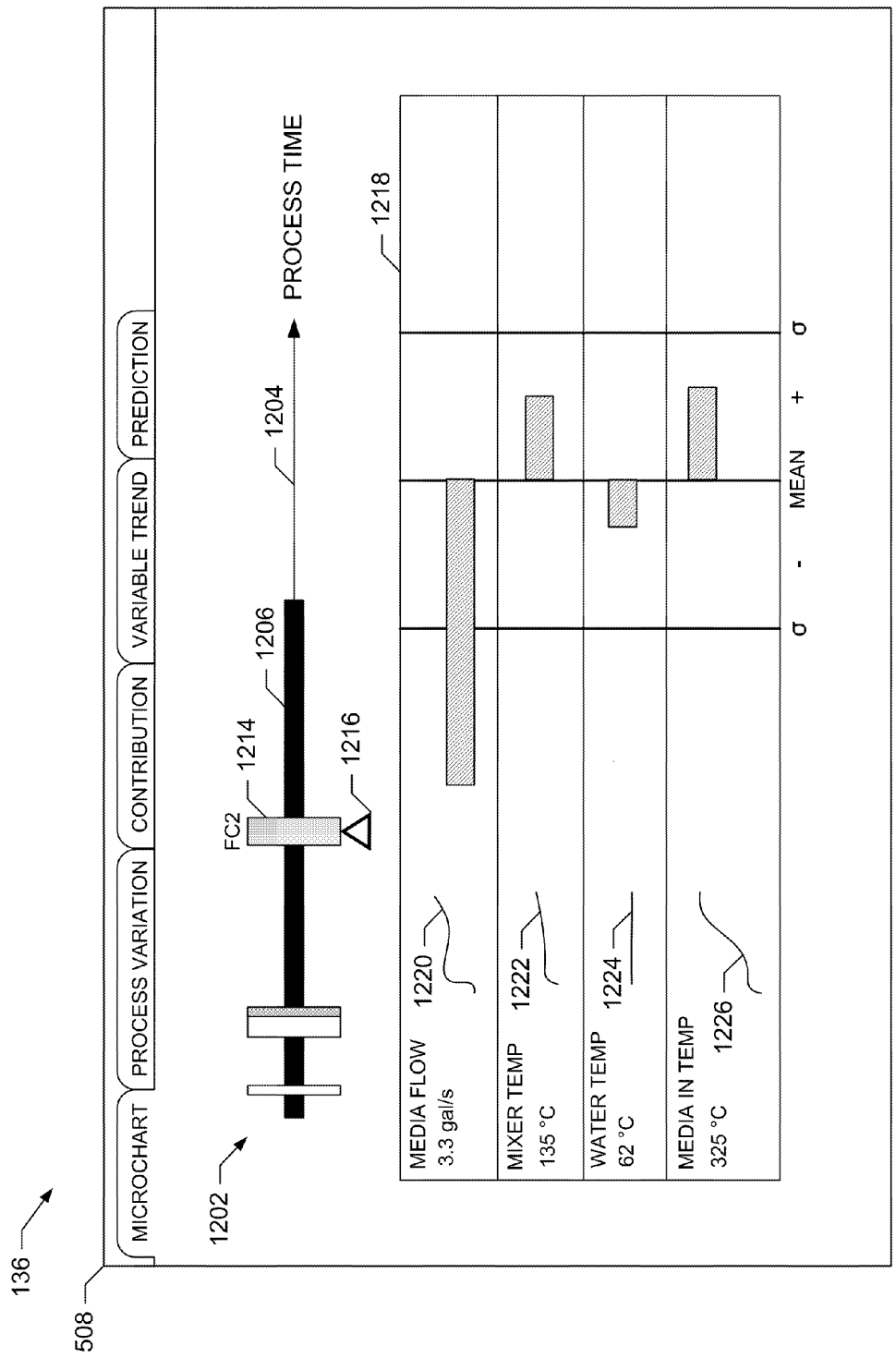
FIG. 13 shows the user interface of FIG. 6 displaying the example microchart of FIG. 12 at a selected second time.

FIG. 13 shows the user interface 136 of FIG. 6 displaying the example microchart 508 of FIG. 12 at a selected second time. In the example of FIG. 13, the plot time position arrow 1216 is moved to the second time on the current progression 1206 of the batch process time 1204. The plot time position arrow 1216 is positioned at the occurrence of the fault 1214. Thus, the bar chart 1218 shows variable values associated with the second time and the variables show numerical values associated with the second time (e.g., Media Flow at 3.3 gal/s). Additionally, the spark lines 1220-1226 show previous values of each variable up until the second time. In other examples, the spark lines 1220-1226 may include the previous values of each variable through the current time of the batch process but may show an indication of the second time. The example of FIG. 13 shows that the fault 1214 may be attributed to the media flow that is exceeding the standard deviation shown in the bar chart 1218. Additionally, the bar in the bar chart 1218 associated with Media Flow may change colors and/or shading to indicate the variable is a contributing factor to the fault 1214.

Figure 14A:
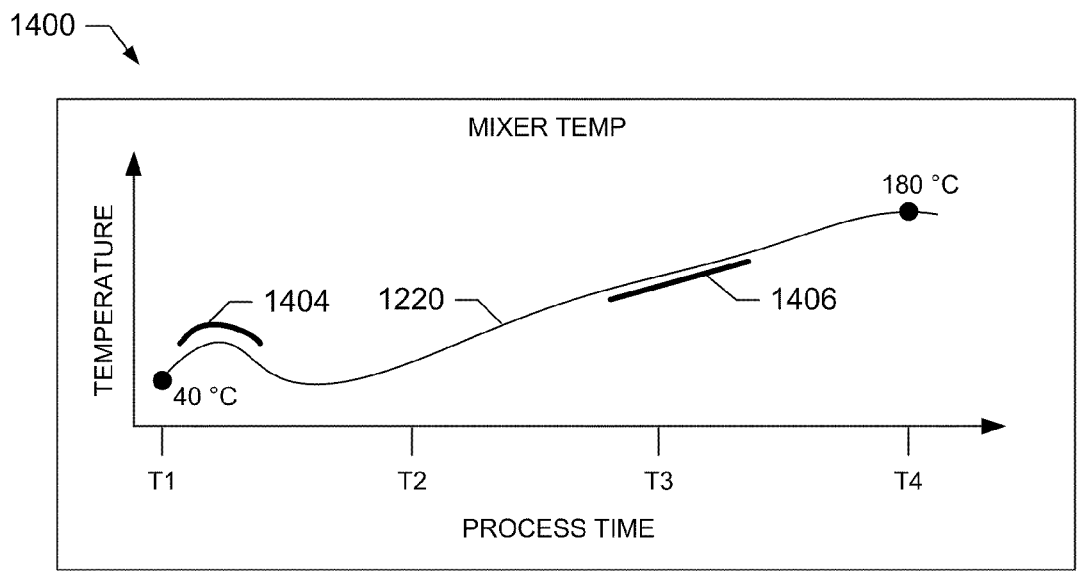
FIGS. 14A and 14B show the user interface of FIG. 6 displaying example spark lines for the Mixer Temp process variable of FIGS. 12 and 13.
Figure 14B:
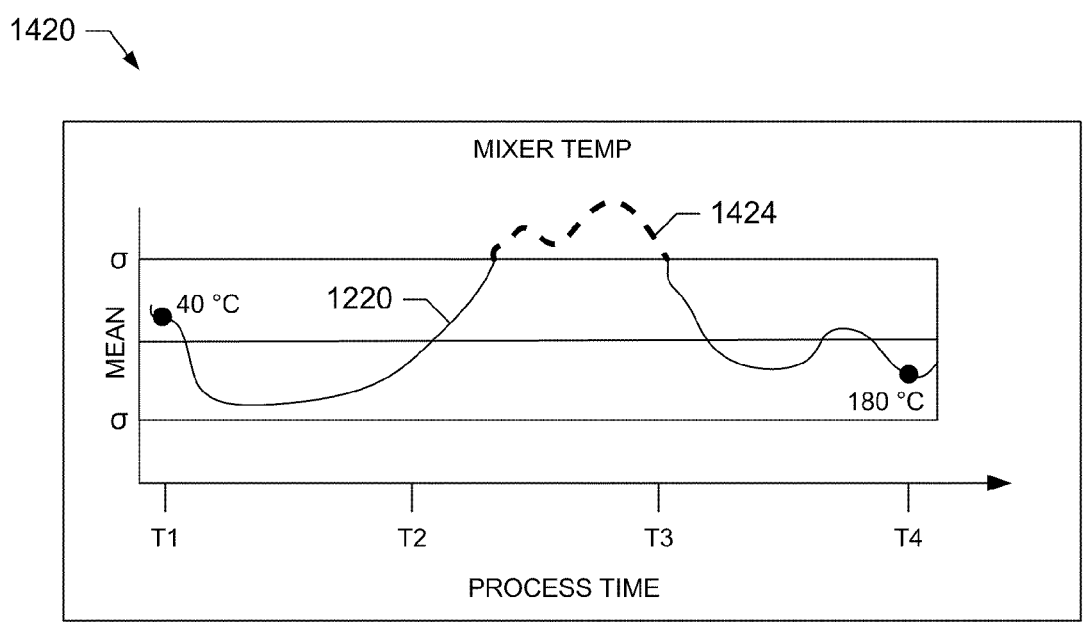

FIGS. 14A and 14B show the user interface 136 of FIG. 6 displaying example spark lines 1220 for the Mixer Temp process variable of FIGS. 12 and 13. Spark line graphs 1400 and/or 1420 may be generated and/or displayed within the user interface 136 by a selection of the spark line 1220 in FIGS. 12 and/or 13. The example spark line graphs 1400 and 1420 of FIGS. 14A and 14B show two different configurations for displaying previous variable values in a batch process. However, other spark lines graphs may be configured differently to display previous variable values in a batch process.

The example spark line graph 1400 of FIG. 14A includes the spark line Mixer Temp spark line 1220 for batch process times T1-T4. The spark line 1220 is shown along an absolute scale of temperature. For example, at T 1, the Mixer Temp is at 40° C. and at T4 the Mixer Temp is 180° C. Thus, as shown, the spark line 1220 increases in relation to the temperature.

Additionally, the spark line graph 1400 includes deviation indicators 1404 and 1406. A length of the deviation indicators 1404 and 1406 correspond to a time variable values exceed a threshold. A height of the deviation indicators 1404 and 1406 from the spark line may indicate how much the variable values exceed the threshold. The deviation indicator 1404 positioned above the spark line 1220 may indicate the variable values exceed an upper standard deviation limit while the deviation indicator 1406 positioned below the spark line 1220 may indicate the variable values exceed a lower standard deviation limit. Furthermore, the deviation indicators 1404 and 1406 may be colored to indicate the severity of a deviation, the amount of the deviation, and/or a type of deviation.

The example spark line graph 1420 of FIG. 14B includes the spark line Mixer Temp spark line 1220 for batch process times T1-T4. The spark line 1220 is shown along a mean and standard deviation scale. For example, the spark line graph 1420 shows the variable values of the spark line 1220 in relation to a calculated mean value for the Mixer Temp during the batch process from times T1-T4. Additionally, the spark line graph 1420 includes a deviation indication 1424. The deviation indication 1424 does not correspond to the deviation indications 1404 and 1406 shown in the spark line graph 1400 of FIG. 4A. The example deviation indication 1424 provides a visual indication to an operator that a portion of the spark line 1220 exceeds a standard deviation (e.g., a threshold). The deviation indication 1424 may be visually indicated by a dashed line, a bold line, line colors, shapes, and/or icons.

FIGS. 15, 16A-16F, and 17A-17B are flowcharts of example methods that may be carried out to implement the example OMS 102, the example controller 108, the example user interface 136, the example batch data receiver 402, the example analytic processor 114, the example analytic process modeler 408, the example evaluation process modeler 410, example process model generator 412, the example display manager 420, the example session controller 422, the example online data processor 116, the example web access server 428, and/or the example in-plant access server 424 of FIGS. 1 and/or 4. The example methods of 15, 16A-16F, and/or 17A-17B may be carried out by a processor, a controller and/or any other suitable processing device. For example, the example methods of FIGS. 15, 16A-16F, and/or 17A-17B may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform P10 discussed below in connection with FIG. 18). Combinations of the above are also included within the scope of computer-readable media.

Methods comprise, for example, instructions and/or data that cause a processor, a general-purpose computer, special-purpose computer, or a special-purpose processing machine to implement one or more particular methods. Alternatively, some or all of the example methods of FIGS. 15, 16A-16F, and/or 17A-17B may be implemented using any combination(s) of ASIC(s), PLD(s), FPLD(s), discrete logic, hardware, firmware, etc.

Also, some or all of the example methods of FIGS. 15, 16A-16F, and/or 17A-17B may instead be implemented using manual operations or as any combination of any of the foregoing techniques, for example, any combination of firmware, software, discrete logic and/or hardware. Furthermore, many other methods of implementing the example operations of FIGS. 15, 16A-16F, and/or 17A-17B may be employed. For example, the order of execution of the blocks may be changed, and/or one or more of the blocks described may be changed, eliminated, sub-divided, or combined. Additionally, any or all of the example methods of FIGS. 15, 16A-16F, and/or 17A-17B may be carried out sequentially and/or carried out in parallel by, for example, separate processing threads, processors, devices, discrete logic, circuits, etc.

Figure 15:
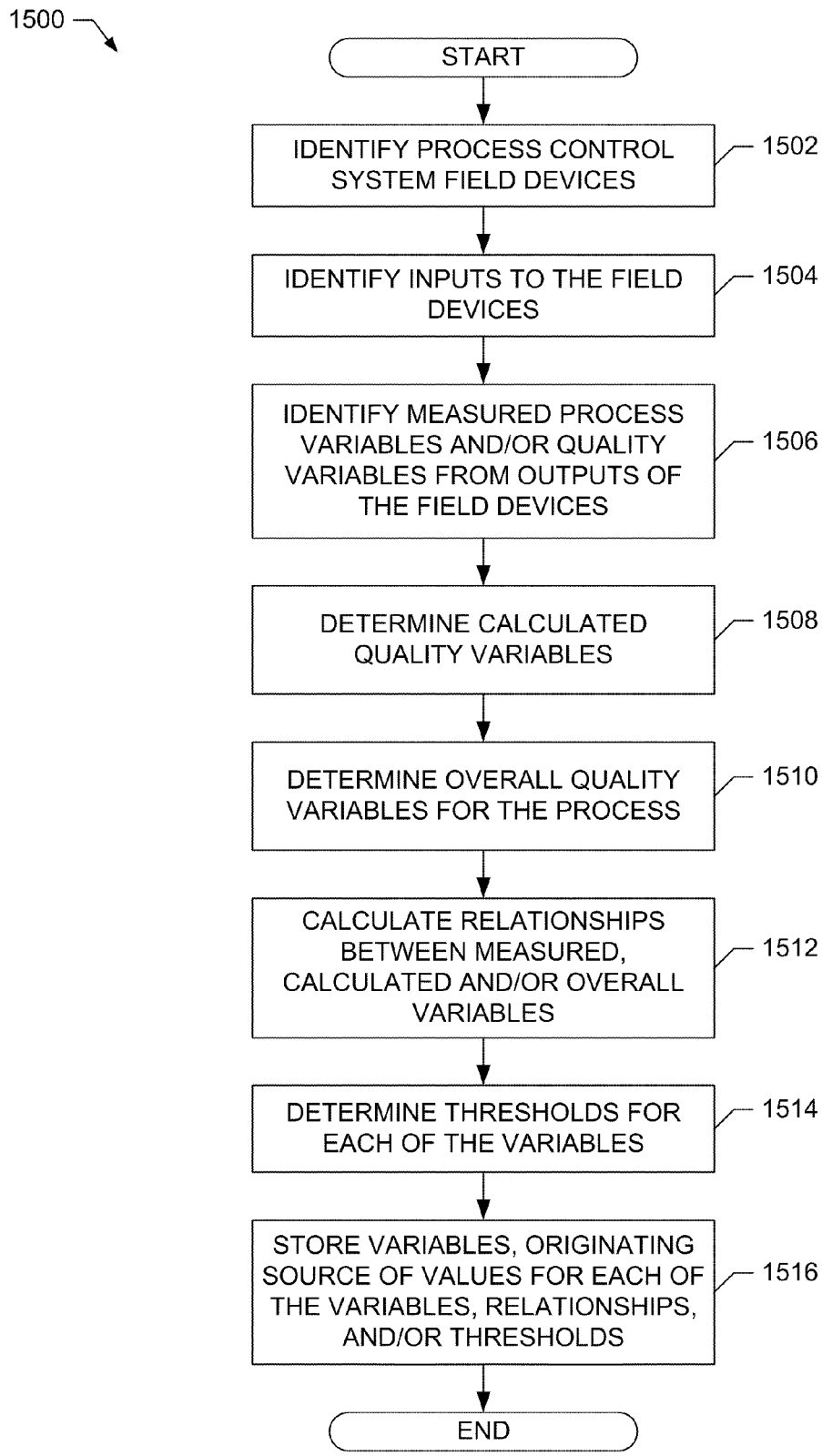
FIGS. 15, 16A-16F, and 17A-17B are flowcharts of example methods that may be used to implement the example operations management system, the example user interface, an example analytics processor, a process model generator, and/or a display manager of FIGS. 1 and/or 4.

The example method 1500 of FIG. 15 models relationships between measured, calculated, and/or overall quality variables based on characteristics of a process control system. Multiple example methods 1500 may be executed in parallel or series to model portions of a process control system and/or to model other process control systems.

The example method 1500 of FIG. 15 begins by identifying field devices within a process control system (block 1502). The example method 1500 may identify field devices by identification serial numbers, process control identification numbers, and/or by any other identification methods. The example method 1500 may then identify the inputs to the field devices (block 1504). Next, the example method 1500 identifies outputs from the field devices and identifies a measured process and/or quality variable associated with each output (block 1506).

The example method 1500 continues by determining calculated quality variables from the measured process and/or quality variables (block 1508). The example method 1500 then determines the overall quality variables for the process based on the measured and/or calculated variables (block 1510). Next, the example method 1500 calculates the relationships (e.g., contribution relationships) between the measured, calculated, and/or overall quality variables (block 1512). The relationships may be determined and/or modeled by the process model generator 412 of FIG. 4 using any multivariable, statistical, algebraic, process control history analysis, and/or optimization method.

The example method 1500 of FIG. 15 then determines thresholds for each of the variables (block 1514). The example method 1500 may use any multivariate, statistical, algebraic, past process analysis, and/or optimization methods and/or calculations discussed in conjunction with the process model generator 412 of FIG. 4 to determine the calculated and/or the overall quality variables from the measured variables. Additionally, the example method 1500 may use any multivariate, statistical, algebraic, past process analysis, and/or optimization methods and/or calculations discussed in conjunction with the process model generator 412 of FIG. 4 to determine the relationships between the variables and the thresholds for each of the variables. Upon determining the thresholds, the example method 1500 stores the variables, originating source of values for each of the variables (e.g., the field devices), the relationships between the variables, and/or the thresholds for each of the variables to the process model database 414 of FIG. 4 (block 1516). Additionally, the example method 1500 may determine prediction models from the process control system and store the prediction models to the database 414. Upon storing the process control variables, thresholds and/or relationships, the example method 1500 ends.

The example method 1600 of FIGS. 16A-16F generates and/or manages navigation between process control graphs and/or the charts (e.g., the graphs and/or charts 502-512 of FIGS. 5-14B). Multiple example methods 1600 may be executed in parallel or in series to generate and/or navigate from the charts and/or graphs. Additionally, multiple example methods 1600 may be implemented for each session initiated by a process control operator. The example method 1600 starts when a process control operator opens a session and selects a process control environment, a plant, and/or a process control system. Additionally, the example method 1600 may start by displaying an overview chart (e.g., the overview chart 502 of FIG. 6).

Figure 16A:
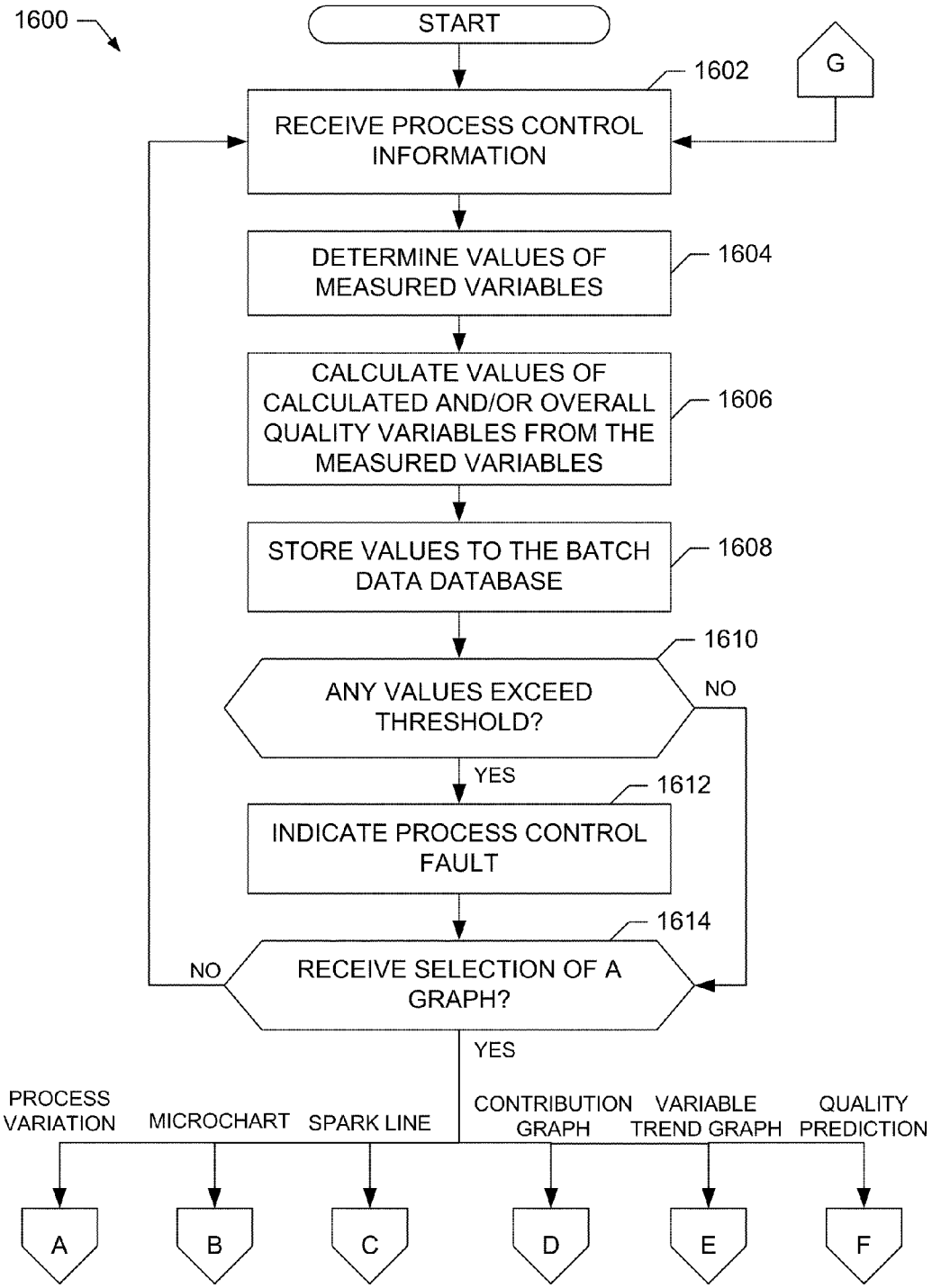

The example method 1600 of FIG. 16A begins by receiving process control information from a controller (e.g., the controller 108 of FIG. 1) (block 1602). Additionally, the example method 1600 may compile the received process control information from previously received process control information associated with the same batch and/or process. Next, the example method 1600 determines values associated with measured values from the received process control information (block 1604). The example method 1600 then calculates values associated with calculated and/or overall quality variables from the values associated with the measured variables (block 1606). The example method 1600 stores the values associated with the variables to the batch data database 416 (block 1608). The values may be stored based on a time at which the values were generated by the field devices (e.g., using a time stamp), by batch number, and/or by a stage within the batch.

The example method 1600 continues by determining if any of the values associated with the variables exceed respective thresholds (block 1610). If one or more values exceed a respective threshold, the example method 1600 indicates a process control fault corresponding to the one or more values exceeding the respective thresholds (block 1612). The example method 1600 then determines if a selection of a graph has been received (block 1614). The selection of a graph may be made by a process control operator. Additionally, if one or more values do not exceed the respective threshold (block 1610), the example method 1610 determines if a selection of a graph has been received (block 1614).

If a selection of a graph has not been received, the example method 1600 continues to receive process control information (block 1602). However, if a selection of a graph has been received, the example method 1600 determines a type of graph selected (e.g., microchart, spark line, contribution graph, variable trend graph, process variation graph, and/or quality prediction graph) (block 1614). Additionally, the example method 1600 may continue to receive process control information and/or include the received variable values within the batch data as an operator selects and views graphs.

Figure 16B:
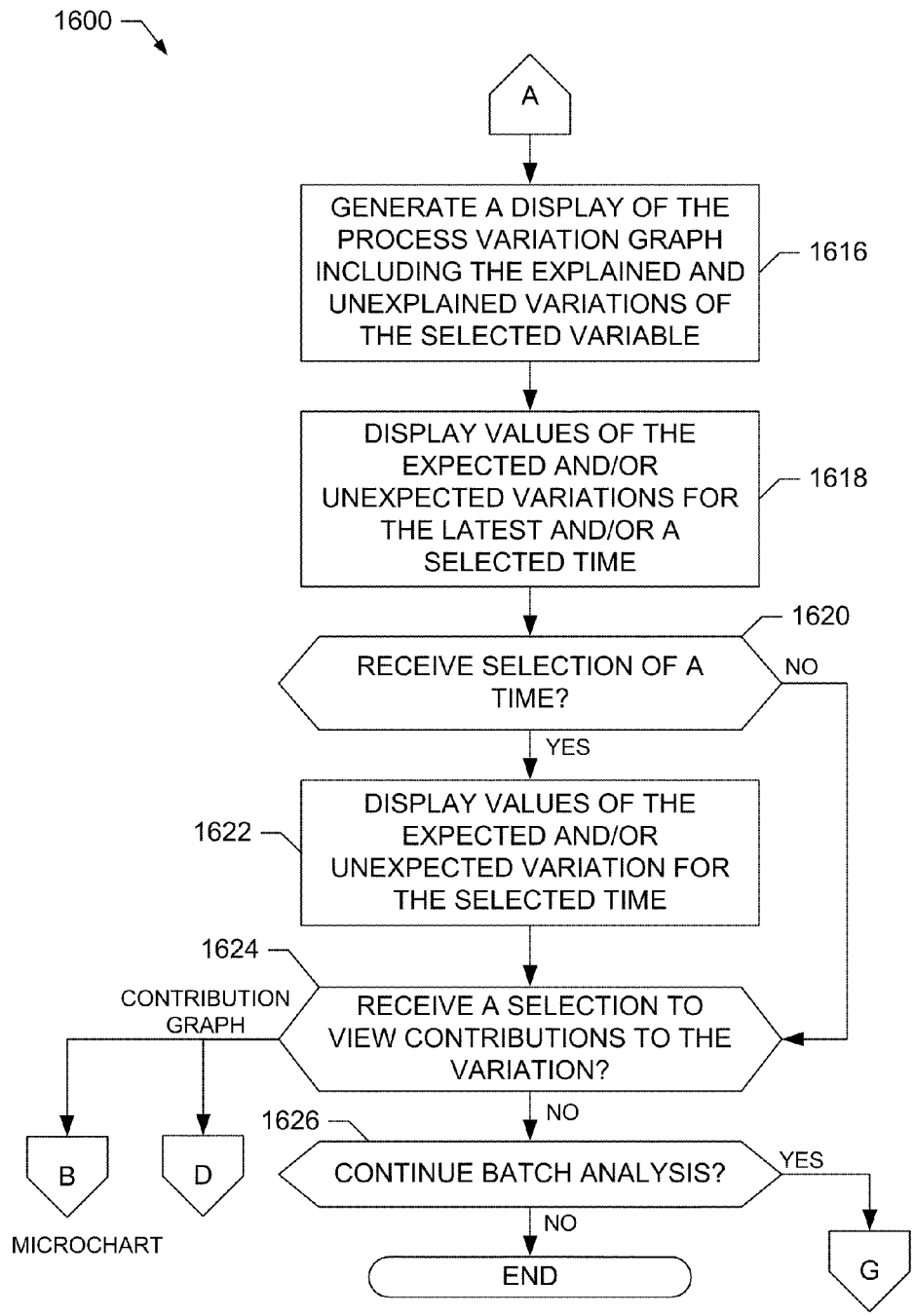

The example method 1600 continues on FIG. 16B if a selection of a process variation graph was received. The example method 1600 generates a display of the process variation graph including an unexplained and/or an explained variation associated with a selected variable (block 1616). The selected variable may correspond to a fault detected by the example method 1600 including an overall quality variable, a measured variable, and/or a calculated variable. Alternatively, the process variation graph may include a history of values and a corresponding threshold associated with the selected variables. The example method 1600 then displays values for the unexplained and/or explained variation for a selected time and/or the latest received process control information (block 1618). For example, if an operator selects a fault from the overview chart, the example method 1600 may display the unexplained and/or explained variation values associated with a time the fault was detected.

The example method 1600 then determines if a selection of a time on the process variation graph was received (block 1620). The selection of a time may correspond to the operator selecting a point on a variation plot corresponding to a process time. If the example method 1600 received a selection of a time, the example method 1600 displays unexplained and/or explained variation values associated with the selected time (block 1622). Then, the example method 1600 determines if a selection has been received to view variable contributions to the variation (block 1624). Also, if a selection of a time on the process variation graph was not received (block 1620), the example method 1600 determines if a selection has been received to view variable contributions to the variation (block 1624).

If a selection was not received to view variable contributions to the variation, the example method 1600 may determine if the operator intends to continue with an analysis of the batch data (block 1626). For example, the operator may determine that after viewing the process variation graph that the process is acceptable and may desire to go back to a display of the overview chart. If the operator intends to continue the batch analysis, the example method 1600 may display the process overview chart and continue to receive process control information (block 1602). If the operator does not intend to continue the batch analysis (block 1626), the operator may terminate the process and the example method 1600 ends.

Figure 16C:
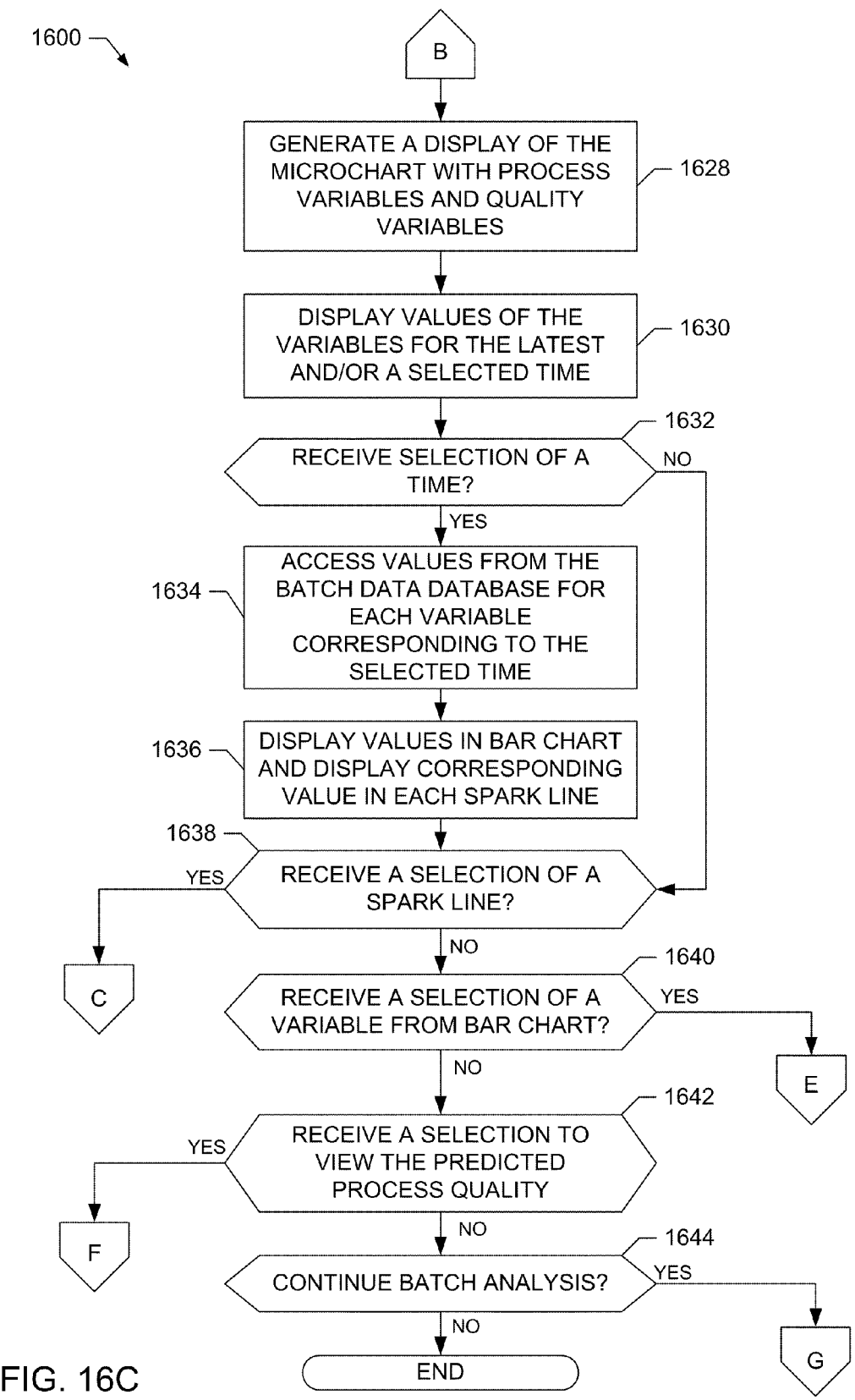

However, if a selection was received to view variable contributions to the variation (bock 1624) and if the contributions were selected to be viewed in a microchart, the example method 1600 continues in FIG. 16C by generating a display of the microchart including measured process and/or quality variables (block 1628). The microchart may also display calculated quality variables. Additionally, the microchart may be displayed by the example method 1600 upon receiving a selection of a microchart (block 1614). The example method 1600 displays the values of the variables within the microchart based on a selection of a time by the operator (block 1630). For example, the time selection may be a time associated with a process fault when the operator selects the process fault in the overview chart and/or may be a time selected to view the unexplained and/or explained variation in the process variation graph. Upon displaying the microchart, the example method 1600 determines if another selection of time has been received (block 1632). A selection of a time may be made in a microchart by sliding an arrow along a timeline to a desired time in the process. Alternatively, a selection of a time may be made by selecting a point on a spark line associated with a variable within the microchart.

If the example method receives a selection of a time, the example method 1600 accesses values from the batch data database 416 corresponding to the selected time for each of the variables displayed within the microchart (block 1634). Alternatively, the values may already be included within the generated microchart. In cases where the values are already included within the microchart (e.g., in a flash plug-in application), the example method 1600 updates the display of the microchart to show the values associated with the selected time.

The example method 1600 then displays the values within the bar chart and/or spark lines associated with each of the displayed variables (block 1636). Next, the example method 1600 determines if a selection has been received associated with a spark line of at least one of the variables (block 1638). Additionally, if the example method 1600 does not receive a selection of a time (block 1632), the example method 1600 determines if a selection has been received associated with a spark line of at least one of the variables (block 1638).

Figure 16D:
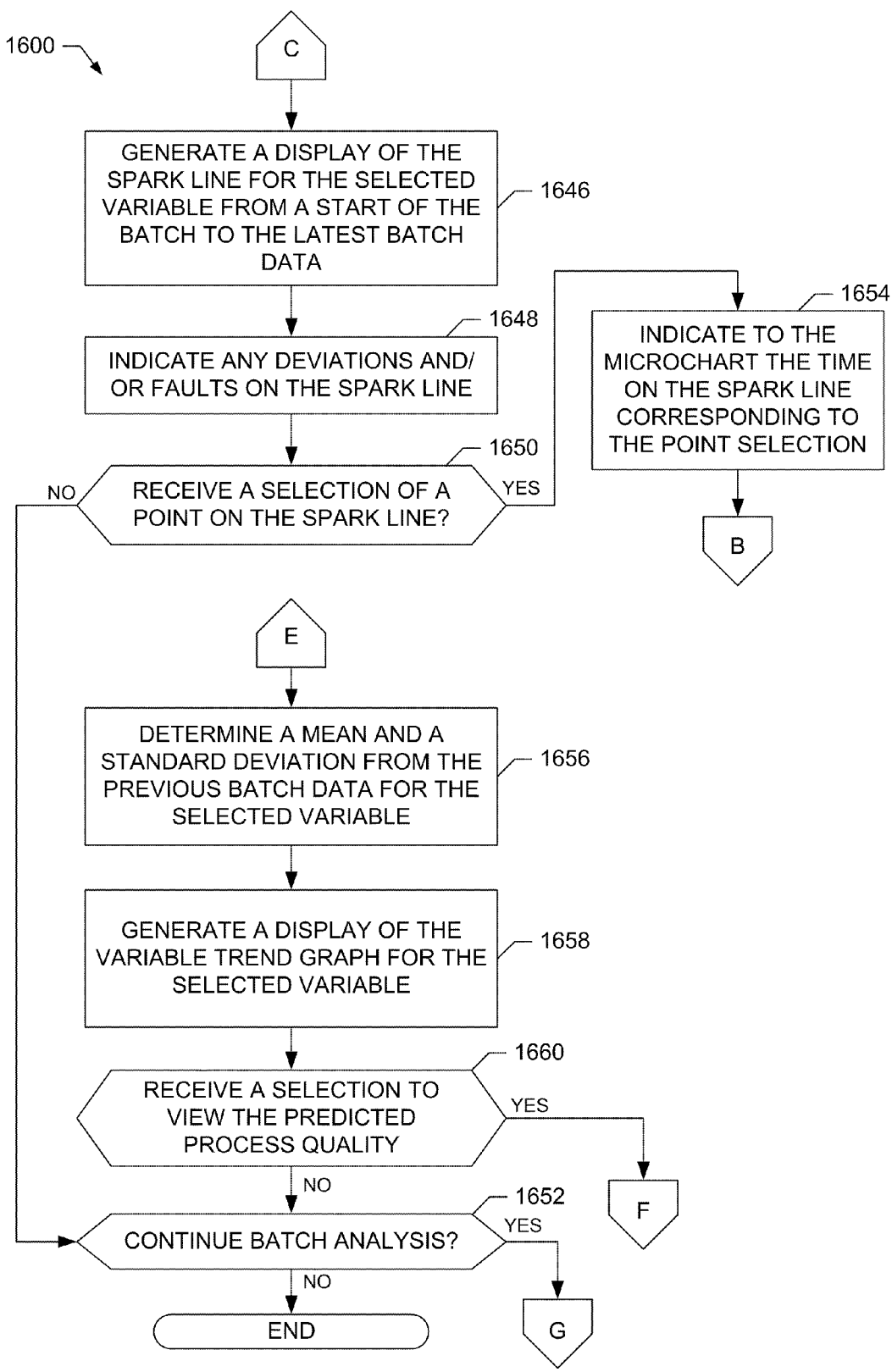

If the example method 1600 receives a selection of a variable within a spark line, the example method 1600 of FIG. 16D generates a detailed display of the selected spark line for the selected variable (block 1646). The example method 1600 may also generate a spark line by receiving a selection of a graph from the operator (block 1614). The spark line may start at a time from a start of the batch and end at a time associated with the latest batch data. Alternatively, the spark line may show a time period specified by the operator (e.g., a stage, an operation, a specified time around the occurrence of a fault, etc.). The example method 1600 may then indicate any deviations and/or faults of any values within the spark line that may exceed an associated threshold (block 1648).

Next, the example method 1600 determines if a selection has been received of a point on the displayed spark line (block 1650). If a point has not been selected, the example method 1600 may determine if the operator intends to continue with an analysis of the batch data (block 1652). If the operator intends to continue the batch analysis, the example method 1600 may display the process overview chart and continue to receive process control information (block 1602). If the operator does not intend to continue the batch analysis (block 1652), the operator may terminate the process and the example method 1600 ends. However, if the example method 1600 of FIG. 16D receives a selection of a point on the spark line (block 1650), the example method 1600 may return to displaying the microchart with variable values associated with the time on the spark line selected by the operator (blocks 1654, 1628 and 1630).

If the example method 1600 of FIG. 16C does not receive a selection of a spark line (block 1638), the example method 1600 determines if a selection has been received of a variable displayed within the bar chart of the microchart (block 1640). The example method 1600 of FIG. 16D continues if a selection has been received of a variable displayed within the bar chart by determining a mean and/or a standard deviation from pervious batch data associated with the selected variable (block 1656). The example method 1600 then generates a display of a variable trend graph for the selected variable including the determined mean and/or standard deviation from the previous batch data (block 1658). The example method 1600 may also generate a variable trend graph by receiving a selection of the variable trend graph from the operator (block 1614). Next, the example method 1600 determines if a selection has been received to view a quality prediction graph (block 1660).

If a quality prediction graph has not been selected, the example method 1600 may determine if the operator intends to continue with an analysis of the batch data (block 1652). If the operator intends to continue the batch analysis, the example method 1600 may display the process overview chart and continue to receive process control information (block 1602). If the operator does not intend to continue the batch analysis (block 1652), the operator may terminate the process and the example method 1600 ends.

Figure 16E:
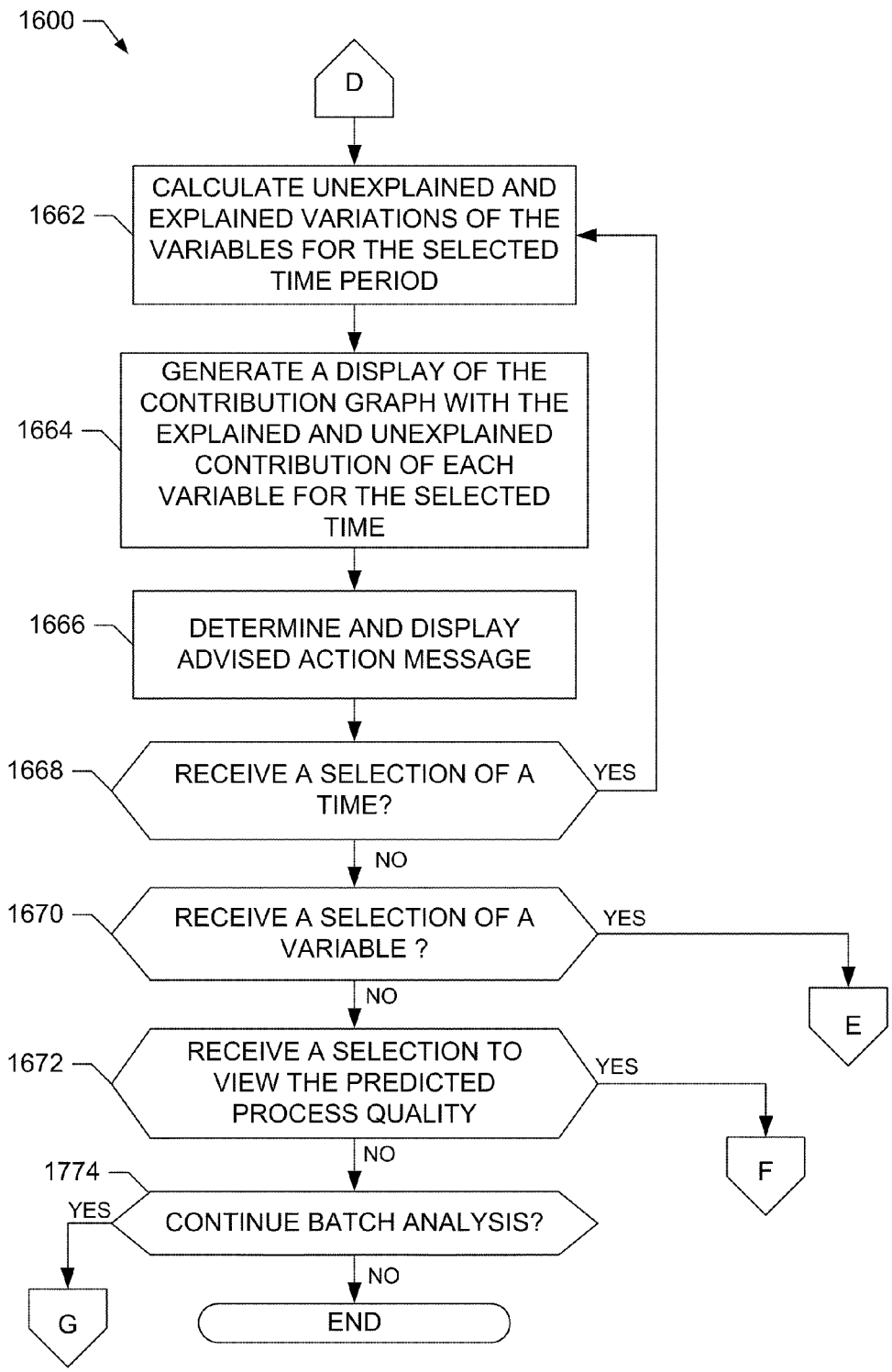
Figure 16F:
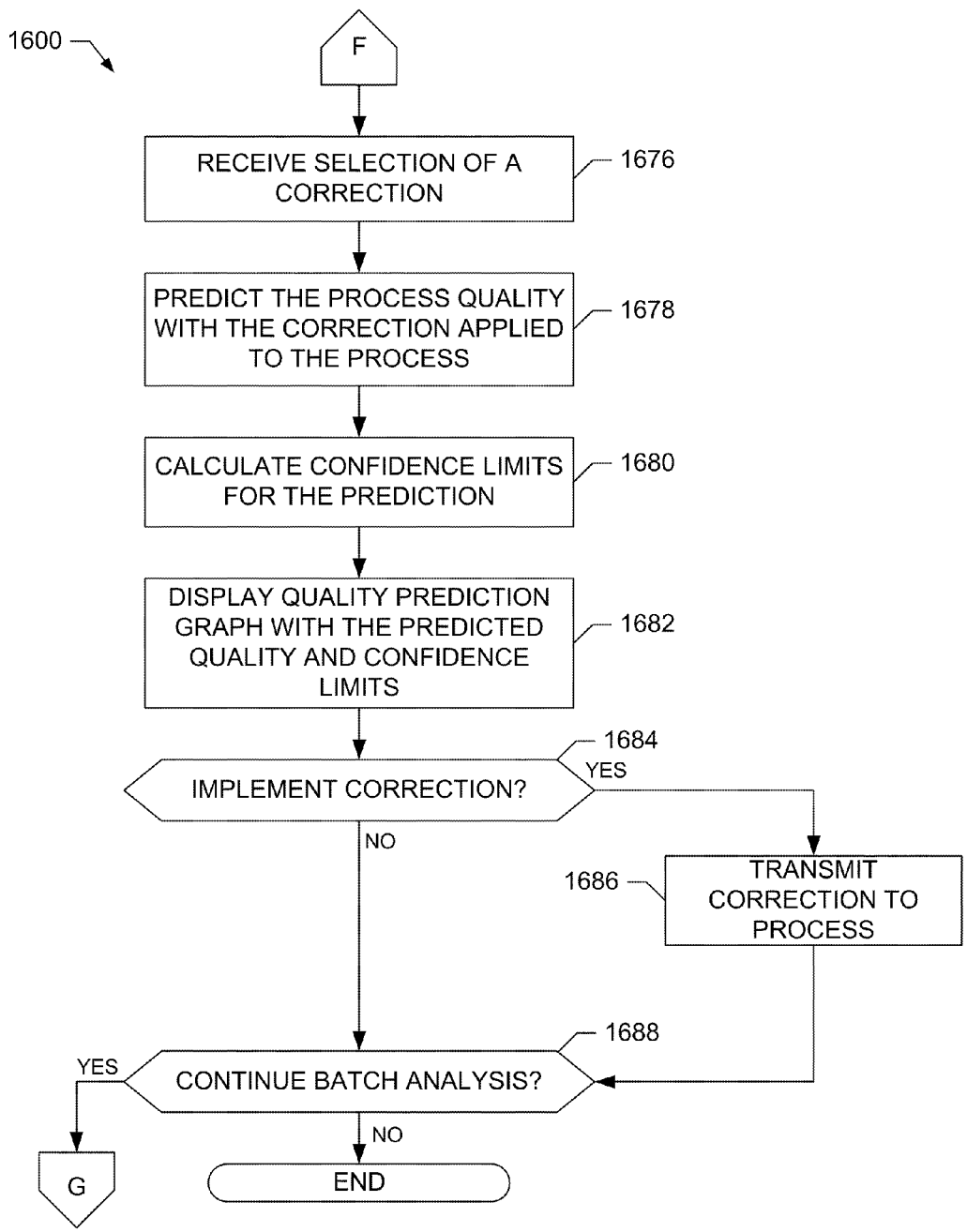

However, if a quality prediction graph has been selected (block 1660), the example method 1600 continues in FIG. 16F. A quality prediction graph may also be selected by the operator in FIG. 16A (block 1614). Further, if the example method 1600 does not receive a selection of a variable within the bar chart (block 1640) but receives a selection to view a quality prediction graph (block 1642) in FIG. 16C, the example method 1600 continues in FIG. 16F.

Alternatively, if the example method 1600 does not receive a selection to view a quality prediction graph (block 1642) in FIG. 16B, the example method 1600 may determine if the operator intends to continue with an analysis of the batch data (block 1644). If the operator intends to continue the batch analysis, the example method 1600 may display the process overview chart and continue to receive process control information (block 1602). If the operator does not intend to continue the batch analysis (block 1644), the operator may terminate the process and the example method 1600 ends.

However, if a selection was received to view variable contributions to the variation and if the contributions were selected to be viewed in a contribution graph (bock 1624), the example method 1600 continues in FIG. 16E by calculating unexplained and/or an explained variations of variables associated with the fault for the selected time period (block 1662). The explained variation may be calculated using a $T^2$ statistic and the unexplained variation may be calculated using a Q statistic. The selected time period may correspond to a time on a process variation graph and/or overview chart selected by the operator. The example method 1600 then generates a display of the contribution graph including the contribution of the explained and/or the unexplained variations for each of the associated variables (block 1664). Alternatively, the contribution graph may display values associated with variables contributing to the process fault, a mean value for each of the values, and/or a stand deviation for each of the values.

The example method 1600 continues by determining and displaying an advised action message (block 1666). The advised action may include corrections that may be applied to the process control system to correct for a detected fault. The example method 1600 then determines if a selection of a time was received within the contribution chart. The section of time corresponds to a time during the current process. If a selection of a time was received, the unexplained and/or the explained variations are calculated for the variables associated with the fault for the newly selected time period (block 1662). If the example method 1600 does not receive a selection of the time, the example method 1600 determines if a selection of a variable within the contribution graph was received (block 1670). If the selection of a variable was received, the example method generates a variable trend graph for the selected variable (blocks 1656 and 1658 of FIG. 16D).

However, if a selection of a variable was not received (block 1670), the example method 1600 determines if a selection to view a quality prediction graph was received (block 1672). If a selection to view a quality prediction graph was received, the example method generates a quality prediction graph in FIG. 16F. If a quality prediction graph has not been selected, the example method 1600 may determine if the operator intends to continue with an analysis of the batch data (block 1674). If the operator intends to continue the batch analysis, the example method 1600 may display the process overview chart and continue to receive process control information (block 1602). If the operator does not intend to continue the batch analysis (block 1674), the operator may terminate the process and the example method 1600 ends.

If the example method 1600 receives a quality prediction graph (blocks 1614, 1642, 1660, 1672), the example method 1600 continues in FIG. 16F by receiving a selection of a correction to the process fault (block 1676). The process control operator may select a correction to the process fault by selecting the correction from a list of possible correction or by entering the correction into the example method 1600. Alternatively, the example method 1600 may determine a correction to the process fault from correction models generated by the example OMS 102 of FIGS. 1 and 4.

The example method 1600 continues by predicting the process quality with the selected correction applied to the process (block 1678). The example method 1600 may predict process quality using any model and/or relationship determined by the process model generator 412 of FIG. 4 using any multivariable, statistical, algebraic, process control history data analysis, and/or optimization method. The predicted process quality may correspond to an overall quality variable, calculated quality variations and/or measured variables. Additionally, the example method 1600 may predict the process quality based on predictive process models generated by the example OMS 102. Next, the example method 1600 calculates confidence limits (e.g., ranges) for the predicted quality (block 1680). The example method 1600 then displays the quality prediction graph with the predicted process quality and corresponding confidence limits (block 1682).

The example method 1600 then determines if the correction is to be implemented within the corresponding process control system (block 1684). If the correction is to be implemented, the example method 1600 transmits the correction to the process via the OMS 102 and/or the controller 108 (block 1686). By transmitting the correction, the process control system may receive instructions associated with the correction to change operating characteristics of field devices associated with the correction. The example method 1600 then determines if the batch analysis is to continue (block 1688). Additionally, if the correction is not to be implemented (block 1684), the example method 1600 determines if the batch analysis is to continue (block 1688). If the operator intends to continue the batch analysis, the example method 1600 may display the process overview chart and continue to receive process control information (block 1602). If the operator does not intend to continue the batch analysis (block 1688), the operator may terminate the process and the example method 1600 ends.

Figure 17A:
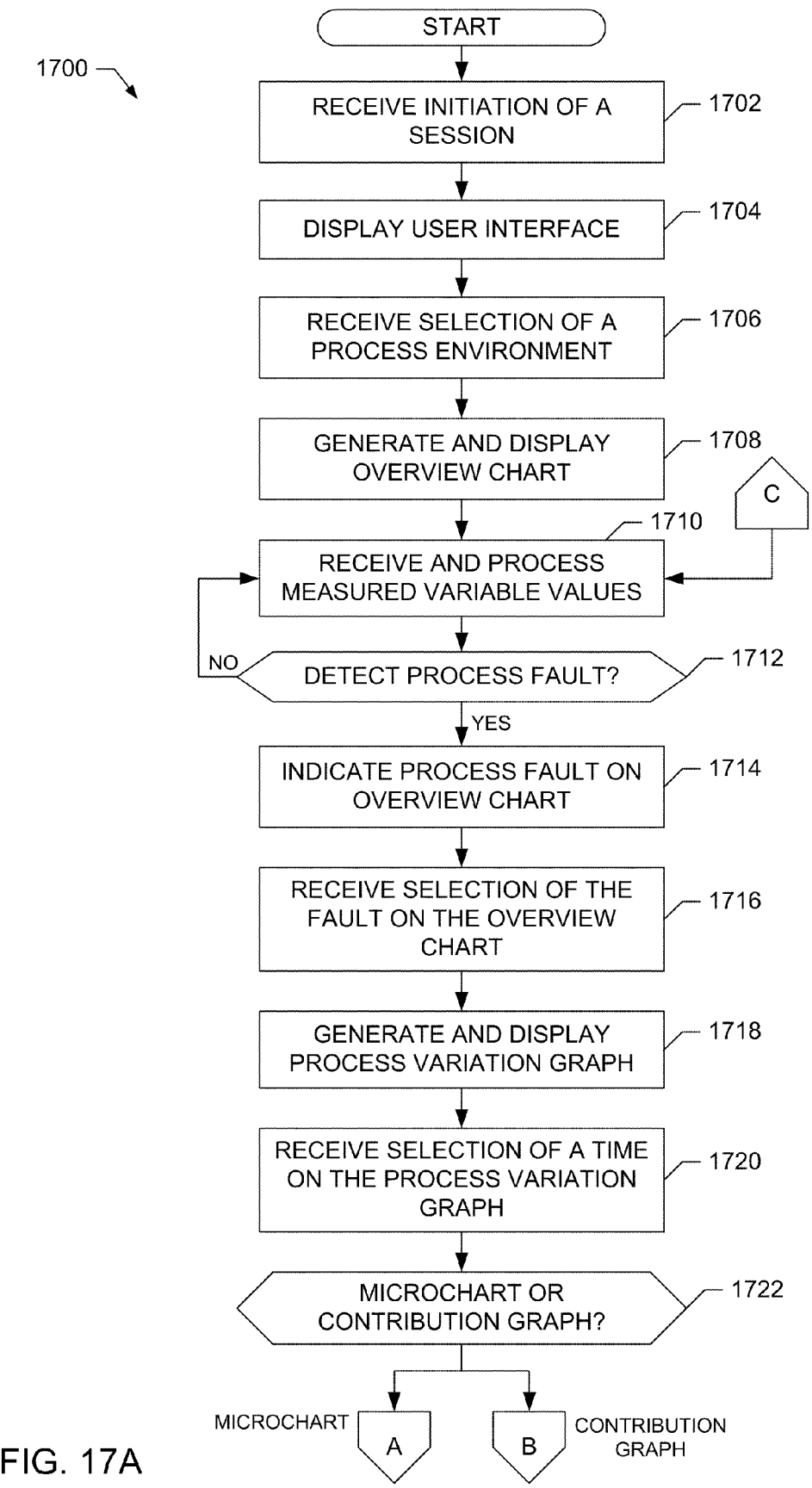
Figure 17B:
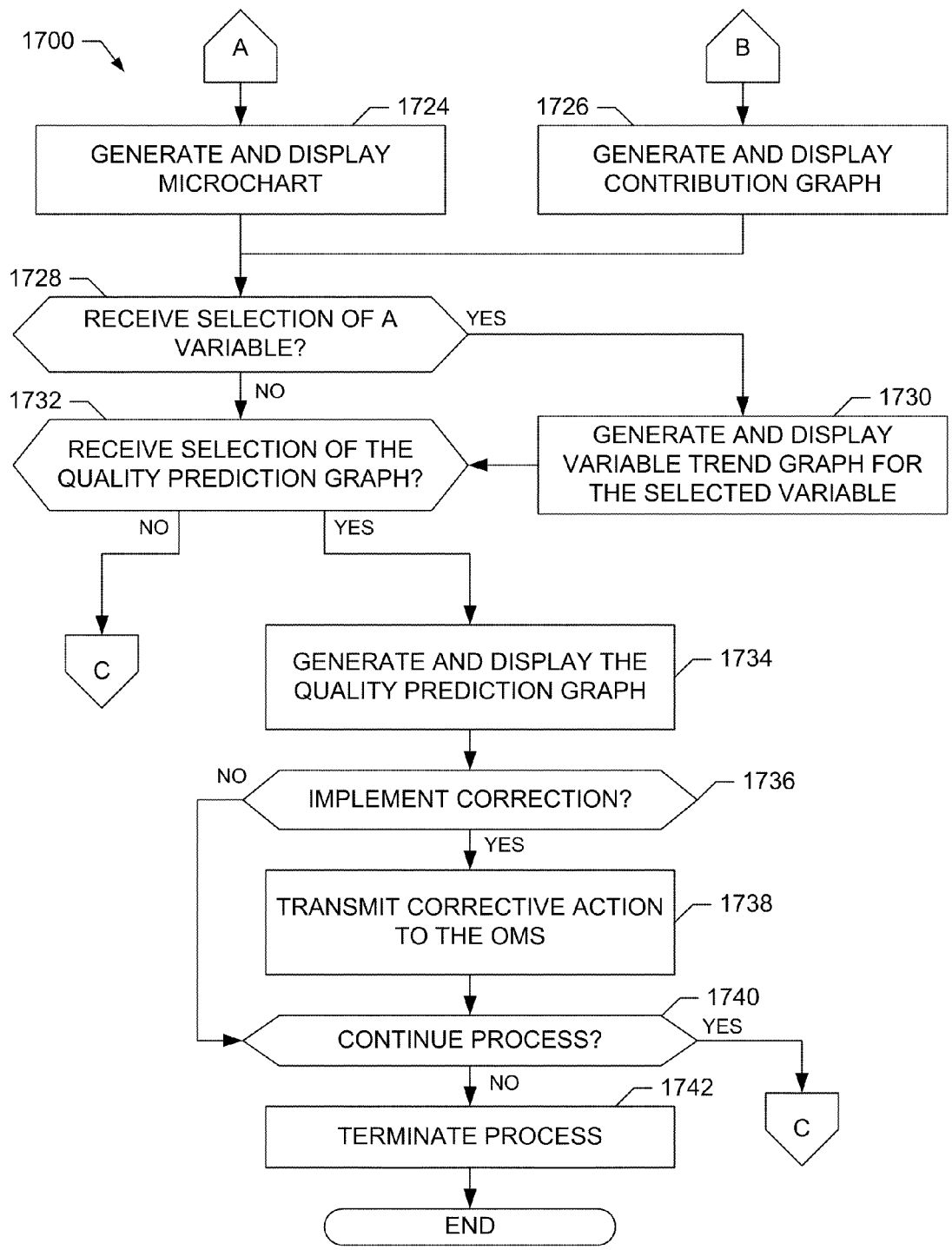

The example method 1700 of FIGS. 17A-17B determines a corrective action to a detected process fault. The example method 1700 may be used to implement the example diagram 500 of FIG. 5. Multiple example methods 1700 may be executed in parallel or series to correct multiple process faults from a common process. Additionally, multiple example methods 1700 may be implemented for a fault detected by a different process. The example method 1700 begins when a process control operator logs into a workstation that includes a capability to display a user interface (e.g., the user interface 136 of FIG. 1).

The example method 1700 of FIG. 17A begins by receiving an initiation of a session by a process control operator (block 1702). The example method 1700 then displays a user interface and prompts the operator to select a process environment (block 1704). The example method 1700 receives a selection of a process environment from the operator (block 1706). Alternatively, the operator may select a plant, a process control system, and/or multiple process control systems. Next, the example method 1700 generates and/or displays an overview chart associated with the selected process environment (block 1708). The example method 1700 then receives and processes measured variable values from the selected process control system, the environment, and/or the plant (block 1710).

The example method 1700 continues by determining if there is a detection of a process fault (block 1712). The process fault may be a result of a variable exceeding a threshold, a prediction of a variable exceeding a threshold, and/or a quality of the process exceeding a threshold. If the example method 1700 determines a fault has not been detected, the example method continues to receive measured variable values from the process control system (block 1710). However, if the example method 1700 detects a process fault, the example method 1700 indicates the detected fault within the overview chart (block 1714). Additionally, the example method 1700 may continue to receive and/or process variable values as the example method 1700 analyzes variable values to determine a cause of the fault.

Next, the example method 1700 receives a selection of the fault on the overview chart (block 1716). The example method 1700 then generates and/or displays a process variation graph associated with the detected fault (block 1718). Upon enabling the operator to review the information on the process variation graph, the example method 1700 may receive a selection of a time on the process variation graph (block 1720). The selection of a time may correspond to a point on the process variation graph where the variation exceeds a threshold during the detected fault. Upon receiving a selection of a time, the example method 1700 determines if the operator selects to view contributing variables to the variation in a microchart and/or a contribution graph (block 1722).

If the operator selects a microchart, the example method 1700 generates and displays a microchart including variables associated with the selected variation in the process variation graph (block 1724). The values associated with the variables may be within a bar chart and/or spark lines within the microchart. While viewing the microchart, the operator may view detailed views of selected spark lines and/or may change a time in the process corresponding to the variable values displayed.

However, if the operator selects a contribution graph, the example method 1700 generates and displays the contribution graph including variables associated with the selected variation in the process variation graph (block 1726). The operator may select a graph by selecting a forward arrow in a process analysis section and/or may select a tab to the corresponding graph in the user interface.

Upon enabling the operator to view the variable values within the microchart and/or the contribution graph, the example method 1700 determines if the operator selected one or more variables within the microchart and/or the contribution graph (block 1728). If a selection was received of at least one variable, the example method 1700 generates and/or displays a variable trend graph for each selected variable (block 1730). The example method 1700 then determines if a selection of a quality prediction graph has been received (block 1732). Additionally, if the operator did not select a variable within the microchart and/or the contribution graph, the example method 1700 determines if a selection of a quality prediction graph has been received (block 1732). An operator may select to view a quality prediction graph by selecting a corresponding tab in the user interface and/or by selecting the quality prediction graph through a variable trend graph.

If the example method 1700 did not receive a selection of a quality prediction graph, the example method 1700 may revert back to the overview chart and continue to receive and/or process measured variable values (block 1710). However, if the example method 1700 received a selection of a quality prediction graph (block 1732), the example method generates and/or displays the quality prediction graph (block 1734). Upon displaying the quality prediction graph 1700, the example method determines if a correction has been implemented (block 1736). If the correction is to be implemented, the example method 1700 transmits the correction to the process via the OMS 102 and/or the controller 108 (block 1738). By transmitting the correction, the process control system may receive instructions associated with the correction to change operating characteristics of field devices associated with the correction. The example method 1700 then determines if the batch analysis is to continue (block 1740). Additionally, if the correction is not to be implemented (block 1736), the example method 1700 determines if the batch analysis is to continue (block 1740). If the operator intends to continue the batch analysis, the example method 1700 may display the process overview chart and continue to receive process control information (block 1710). If the operator does not intend to continue the batch analysis (block 1740), the example method terminates the process (block 1742) and the example method 1700 ends.

Figure 18:
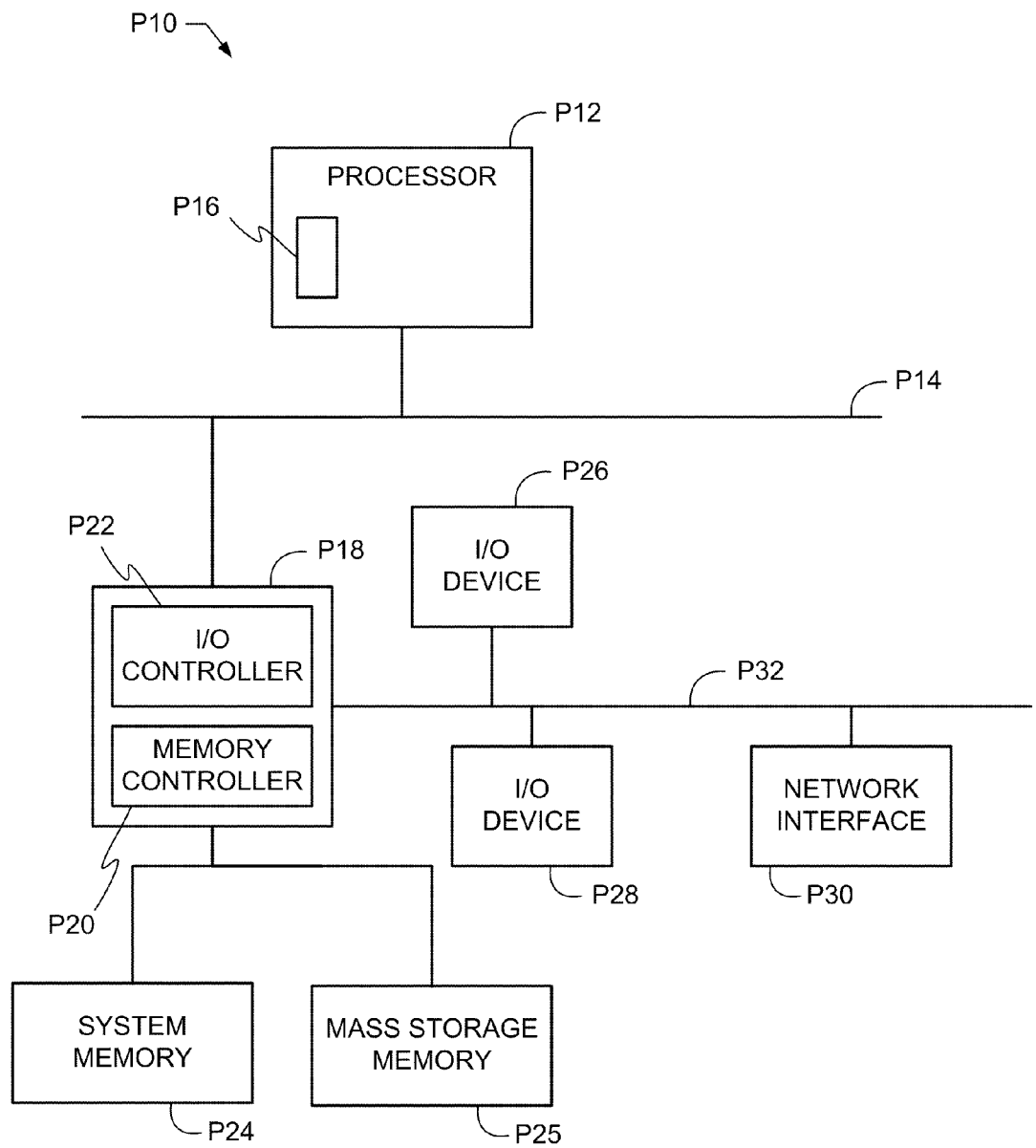
FIG. 18 is a block diagram of an example processor system that may be used to implement the example methods and apparatus described herein.

FIG. 18 is a block diagram of an example processor system P10 that may be used to implement the example methods and apparatus described herein. For example, processor systems similar or identical to the example processor system P10 may be used to implement the example OMS 102, the example batch data receiver 402, the example analytic processor 114, the example analytic process modeler 408, the example evaluation process modeler 410, the example process model generator 412, the example display manager 420, the example session controller 422, the example online data processor 116, the example in-plant access server 424, and/or the example web access server 428 of FIGS. 1 and/or 4. Although the example processor system P10 is described below as including a plurality of peripherals, interfaces, chips, memories, etc., one or more of those elements may be omitted from other example processor systems used to implement one or more of the example OMS 102, the example batch data receiver 402, the example analytic processor 114, the example analytic process modeler 408, the example evaluation process modeler 410, the example process model generator 412, the example display manager 420, the example session controller 422, the example online data processor 116, the example in-plant access server 424, and/or the example web access server 428.

As shown in FIG. 18, the processor system P10 includes a processor P12 that is coupled to an interconnection bus P14. The processor P12 includes a register set or register space P16, which is depicted in FIG. 18 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 18, the system P10 may be a multi-processor system and, thus, may include one or more additional processors that are identical or similar to the processor P12 and that are communicatively coupled to the interconnection bus P14.

The processor P12 of FIG. 18 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the OMS 102 (FIG. 2), the mass storage memory P25 may include a hard disk drive, an optical drive, a tape storage device, etc. Alternatively, if the example processor system P10 is used to implement the process model database 416 and/or the batch data database 406, the mass storage memory P25 may include a solid-state memory (e.g., a flash memory, a RAM memory, etc.), a magnetic memory (e.g., a hard drive), or any other memory suitable for mass storage in the process model database 416 and/or the batch data database 406.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 18 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to predict process quality in a process control system, comprising:
receiving process control information relating to a process at a first time including a first value associated with a first measured variable and a second value associated with a second measured variable;
determining if a variation based on the received process control information exceeds a first threshold;
if the variation exceeds the first threshold, calculating a first contribution value based on a contribution of the first measured variable to the variation and a second contribution value based on a contribution of the second measured variable to the variation;
determining at least one corrective action based on at least one of the first contribution value, the second contribution value, the first value, or the second value;
calculating a predicted process quality based on the at least one corrective action at a time after the first time;
calculating a first unexplained variation and a first explained variation associated with the first contribution value;
calculating a second unexplained variation and a second explained variation associated with the second contribution value;
displaying the first unexplained variation and the first explained variation in a chart by at least one of superimposing the first unexplained variation on the first explained variation or showing together the first unexplained variation with the first explained variation; and
displaying the second unexplained variation and the second explained variation in the chart by at least one of superimposing the second unexplained variation on the second explained variation or showing the second unexplained variation together with the second explained variation.

2. A method as defined in claim 1, further comprising:
displaying graphically the variation in a first graphic via a user interface;
displaying graphically the first contribution value and the second contribution value in a second graphic via the user interface, wherein the second graphic is selectable from a portion of the first graphic;
displaying the at least one corrective action via the user interface; and
displaying graphically the predicted process quality in a third graphic via the user interface, wherein the third graphic is selectable from a portion of the second graphic.

3. A method as defined in claim 1, further comprising:
displaying graphically the variation in a first graphic; and
displaying graphically the first contribution value and the second contribution value within the first graphic.

4. A method as defined in claim 1, further comprising:
calculating at least one of the predicted process quality or the variation based on at least one of the first value or the second value;
indicating a predicted fault if the at least one of the predicted process quality or the variation exceeds a second threshold; and
displaying the predicted fault within a first graphic and displaying the at least one corrective action within a second graphic.

5. A method as defined in claim 1, further comprising:
receiving a selection of at least one of the first measured variable or the second measured variable from a portion of a first graphic;
displaying graphically the value associated with the selected measured variable and corresponding past values over a time period of the process in a second graphic;
displaying an average of the past values associated with the selected measured variable in the second graphic over the time period of the process; and
displaying a standard deviation of the past values associated with the selected measured variable in the second graphic over the time period of the process.

6. A method as defined in claim 1, further comprising:
displaying the predicted process quality in relation to at least one of a confidence range of the predicted process quality or a second threshold of the predicted process quality;
displaying the predicted process quality over a time period of the process; and
applying the at least one corrective action to the process.

7. A method as defined in claim 1, further comprising:
calculating a third value associated with a calculated quality variable, the third value to be calculated based on at least one of the first measured variable or the second measured variable;
calculating a third contribution value based on a contribution of the calculated quality variable to the variation; and
determining the at least one corrective action based on the third contribution value.

8. A method as defined in claim 7, further comprising:
determining if the first value exceeds a second threshold;
determining if the second value exceeds a third threshold;
determining if the third value exceeds a fourth threshold;
if at least one of the first value, the second value, or the third value exceeds the respective one of the thresholds, indicating in a second chart at least one of a process fault, a deviation of the first measured variable, a deviation of the second measured variable, a deviation of the quality variable, a process deviation, a duration of the fault, a cause of the process fault, or the variation of the process.

9. A method as defined in claim 8, further comprising:
displaying the first value and the second value in a first graphic that is selectable from at least one of a portion of a second graphic, a portion of a third graphic or a portion of the second chart; and
displaying at least one of a timeline corresponding to a time period of the process, a bar chart indicating the first value and the second value normalized in relation to a mean and a standard deviation, or spark lines corresponding to the first measured variable and the second measured variable showing past process values for the first measured variable and the second measured variable.

10. A method as defined in claim 9, wherein the timeline includes at least one of an indication of a fault associated with the variation of the process, a current progress of the process in relation to the time period of the process, a selectable arrow that changes at least one of the values displayed in the bar chart to values corresponding to a time position of the arrow on the timeline, or a progress of the spark lines corresponding to a time position of the arrow on the timeline.

11. A method as defined in claim 9, wherein the spark lines include an indication of a deviation if past values associated with the at least one first measured variable or the second measured variable exceed a fifth threshold.

12. A method as defined in claim 1, further comprising:
receiving process control information relating to the process at a second time including a third value associated with the first measured variable and a fourth value associated with the second measured variable;
determining if a second variation associated with the process based on the received process control information at the second time exceeds the first threshold and graphically displaying the second variation in a first graphic;
if the second variation exceeds the first threshold, calculating a third contribution value based on a contribution of the first measured variable to the second variation at the second time and a fourth contribution value based on a contribution of the second measured variable to the second variation at the second time;
displaying graphically the third contribution value and the fourth contribution value in a second graphic that is selectable from a portion of the first graphic;
determining at least one corrective action based on the third contribution value or the fourth contribution value and displaying, in the second graphic, the at least one corrective action that is determined based on the third contribution value or the fourth contribution value;
calculating, at a time after the second time, the predicted process quality based on the at least one corrective action that is determined based on the third contribution value or the fourth contribution value; and
graphically displaying the predicted process quality in a third graphic that is selectable from a portion of the second graphic.

13. A method as defined in claim 1, wherein the first measured variable and the second measured variable comprise at least one of a measured process variable or a measured quality variable.

14. A method as defined in claim 1, wherein the variation is based on at least one of a multivariate analysis, an algebraic analysis, an optimization analysis, a past batch process analysis, a statistical analysis, a regression analysis, a correlation analysis, a repeatability analysis, a reproduction analysis, or a time series analysis of at least one of the first measured variable or the second measured variable.

15. A method as defined in claim 1, wherein calculating the first contribution value and the second contribution value includes determining a relationship between the first and second contribution values and the variation based on at least one of a multivariate analysis, an algebraic analysis, an optimization analysis, a past batch process analysis, a statistical analysis, a regression analysis, a correlation analysis, a repeatability analysis, a reproduction analysis, or a time series analysis.

16. A method as defined in claim 1, wherein calculating the predicted process quality includes:
determining a relationship of an overall quality variable associated with the predicted process quality with at least one of the first measured variable or the second measured variable based on at least one of a multivariate analysis, an algebraic analysis, an optimization analysis, a past batch process analysis, a statistical analysis, a regression analysis, a correlation analysis, a repeatability analysis, a reproduction analysis, or a time series analysis;
applying the at least one corrective action to the relationship; and
calculating the predicted process quality from the relationship.

17. An apparatus to predict process quality in a process control system, comprising:
a data receiver to receive process control information relating to a process at a first time including a first value associated with a first measured variable and a second value associated with a second measured variable;
a processor to:
determine if a variation based on the received process control information exceeds a first threshold;
if the variation exceeds the first threshold, calculate a first contribution value based on a contribution of the first measured variable to the variation and a second contribution value based on a contribution of the second measured variable to the variation;
determine at least one corrective action based on at least one of the first contribution value, the second contribution value, the first value, or the second value;
calculate a predicted process quality based on the at least one corrective action at a time after the first time;
calculate a first unexplained variation and a first explained variation associated with the first contribution value; and
calculate a second unexplained variation and a second explained variation associated with the second contribution value; and
a display manager to:
display the first unexplained variation and the first explained variation in a chart by at least one of superimposing the first unexplained variation on the first explained variation or showing together the first unexplained variation with the first explained variation; and
display the second unexplained variation and the second explained variation in the chart by at least one of superimposing the second unexplained variation on the second explained variation or showing together the second unexplained variation with the second explained variation.

18. An apparatus as defined in claim 17, further comprising a display manager to:
- display graphically the variation in a first graphic via a user interface;
- display graphically the first contribution value and the second contribution value in a second graphic via the user interface, wherein the second graphic is selectable from a portion of the first graphic;
- display graphically the at least one corrective action via the user interface; and
- display graphically the predicted process quality in a third graphic via the user interface, wherein the third graphic is selectable from a portion of the second graphic.

19. An apparatus as defined in claim 17, wherein the display manager is to:
- display graphically the variation in a first graphic; and
- display graphically the first contribution value and the second contribution value in the first graphic.

20. An apparatus as defined in claim 17, wherein the display manager is to:
- receive a selection of at least one of the first measured variable or the second measured variable from a portion of a first graphic;
- display graphically the value associated with the selected measured variable and corresponding past values over a time period of the process in a second graphic;
- display an average of the past values associated with the selected measured variable in the second graphic over the time period of the process; and
- display a standard deviation of the past values associated with the selected measured variable in the second graphic over the time period of the process.

21. An apparatus as defined in claim 17, wherein the display manager is to:
- display graphically the predicted process quality in relation to at least one of a confidence range of the predicted process quality or a second threshold of the predicted process quality; and
- display graphically the predicted process quality over a time period of the process.

22. An apparatus as defined in claim 17, wherein the processor is to apply the at least one corrective action to the process.

23. An apparatus as defined in claim 17, wherein the processor is to:
- calculate a third value associated with a calculated quality variable, the third value to be calculated based on at least one of the first measured variable or the second measured variable;
- calculate a third contribution value based on a contribution of the calculated quality variable to the variation;
- determine the at least one corrective action based on the third contribution value; and
- calculate the predicted process quality based on the at least one corrective action.

24. An apparatus as defined in claim 23, wherein the processor is to:
- determine if the first value exceeds a second threshold;
- determine if the second value exceeds a third threshold;
- determine if the third value exceeds a fourth threshold; and
- if at least one of the first value, the second value, or the third value exceeds the respective one of the thresholds, indicate in a second chart at least one of a process fault, a deviation of the first measured variable, a deviation of the second measured variable, a deviation of the quality variable, a process deviation, a duration of the fault, a cause of the process fault, or the variation of the process.

25. An apparatus as defined in claim 24, wherein the display manager is to:
- display a first graphic upon receiving a selection of a portion of the chart;
- display the first value and the second value in a second graphic that is selectable from at least one of a portion of the first graphic, a portion of a third graphic, or a portion of the second chart; and
- display within the second graphic at least one of a timeline corresponding to a time period of the process, a bar chart indicating the first value and the second value normalized in relation to a mean and a standard deviation, or spark lines corresponding to the first variable and the second variable showing past process values for the first variable and the second variable.

26. A tangible machine-readable storage device excluding propagating signals comprising instructions that, when executed, cause a machine to at least:
- receive process control information relating to a process at a first time including a first value associated with a first measured variable and a second value associated with a second measured variable;
- determine if a variation based on the received process control information exceeds a threshold;
- if the variation exceeds the threshold, calculate a first contribution value based on a contribution of the first measured variable to the variation and a second contribution value based on a contribution of the second measured variable to the variation;
- determine at least one corrective action based on the first contribution value, the second contribution value, the first value, or the second value; and
- calculate a predicted process quality based on the at least one corrective action at a time after the first time;
- calculate a first unexplained variation and a first explained variation associated with the first contribution value;
- calculate a second unexplained variation and a second explained variation associated with the second contribution value;
- display the first unexplained variation and the first explained variation in a chart by at least one of superimposing the first unexplained variation on the first explained variation or showing together the first unexplained variation with the first explained variation; and
- display the second unexplained variation and the second explained variation in the chart by at least one of superimposing the second unexplained variation on the second explained variation or showing the second unexplained variation together with the second explained variation.

27. A storage device as defined in claim 26, wherein the instructions, when executed, cause the machine to:
- display graphically the variation in a first graphic via a user interface;
- display graphically the first contribution value and the second contribution value in a second graphic via the user interface, wherein the second graphic is selectable from a portion of the first graphic;
- display the at least one corrective action via the user interface; and
- display graphically the predicted process quality in a third graphic via the user interface, wherein the third graphic is selectable from a portion of the second graphic.

28. A method to predict process quality in a process control system, comprising:
- receiving process control information relating to a process at a first time including a first value associated with a first measured variable and a second value associated with a second measured variable;
- determining if a variation based on the received process control information exceeds a first threshold;
- if the variation exceeds the first threshold, calculating a first contribution value based on a contribution of the first measured variable to the variation and a second contribution value based on a contribution of the second measured variable to the variation;
- determining a first corrective action based on at least one of the first contribution value, the second contribution value, the first value, or the second value;
- calculating a predicted process quality based on the first corrective action at a time after the first time;
- calculating a third value associated with a calculated quality variable, the third value to be calculated based on at least one of the first measured variable or the second measured variable;
- calculating a third contribution value based on a contribution of the calculated quality variable to the variation;
- determining a second corrective action based on the third contribution value;
- determining if the first value exceeds a second threshold;
- determining if the second value exceeds a third threshold;
- determining if the third value exceeds a fourth threshold;
- if at least one of the first value, the second value, or the third value exceeds the respective one of the thresholds, indicating at least one of a process fault, a deviation of the first measured variable, a deviation of the second measured variable, a deviation of the quality variable, a process deviation, a duration of the fault, a cause of the process fault, or the variation of the process.

29. A method to predict process quality in a process control system, comprising:
- receiving process control information relating to a process at a first time including a first value associated with a first measured variable and a second value associated with a second measured variable;
- determining if a variation based on the received process control information exceeds a threshold;
- if the variation exceeds the threshold, calculating a first contribution value based on a contribution of the first measured variable to the variation and a second contribution value based on a contribution of the second measured variable to the variation;
- determining a first corrective action based on at least one of the first contribution value, the second contribution value, the first value, or the second value;
- calculating a predicted process quality based the first corrective action at a time after the first time;
- receiving process control information relating to the process at a second time including a third value associated with the first measured variable and a fourth value associated with the second measured variable;
- determining if a second variation associated with the process based on the received process control information at the second time exceeds the threshold;
- if the second variation exceeds the threshold, calculating a third contribution value based on a contribution of the first measured variable to the second variation at the second time and a fourth contribution value based on a contribution of the second measured variable to the second variation at the second time;
- determining a second corrective action based on the third contribution value or the fourth contribution value; and
- calculating the predicted process quality based on the second corrective action.

30. An apparatus to predict process quality in a process control system, comprising:
- a data receiver to receive process control information relating to a process at a first time including a first value associated with a first measured variable and a second value associated with a second measured variable;
- a processor to:
  - determine if a variation based on the received process control information exceeds a first threshold;
  - if the variation exceeds the first threshold, calculate a first contribution value based on a contribution of the first measured variable to the variation and a second contribution value based on a contribution of the second measured variable to the variation;
  - determine a first corrective action based on at least one of the first contribution value, the second contribution value, the first value, or the second value;
  - calculate a predicted process quality based on the first corrective action at a time after the first time;
  - calculate a third value associated with a calculated quality variable, the third value to be calculated based on at least one of the first measured variable or the second measured variable;
  - calculate a third contribution value based on a contribution of the calculated quality variable to the variation;
  - determine a second corrective action based on the third contribution value;
  - calculate the predicted process quality based on the second corrective action;
  - determine if the first value exceeds a second threshold;
  - determine if the second value exceeds a third threshold;
  - determine if the third value exceeds a fourth threshold; and
  - if at least one of the first value, the second value, or the third value exceeds the respective one of the thresholds, indicate at least one of a process fault, a deviation of the first measured variable, a deviation of the second measured variable, a deviation of the quality variable, a process deviation, a duration of the fault, a cause of the process fault, or the variation of the process.

* * * * *